US012792178B2

(12) United States Patent
Son et al.

(10) Patent No.: US 12,792,178 B2
(45) Date of Patent: Nov. 10, 2026

(54) ELECTRONIC DEVICE

(71) Applicant: Samsung Display Co., Ltd., Yongin-si (KR)

(72) Inventors: Jungha Son, Yongin-si (KR); Jaseung Ku, Yongin-si (KR); Dongchun Lee, Yongin-si (KR); Jin-Taek Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/251,491

(22) Filed: Jun. 26, 2025

(65) Prior Publication Data

US 2026/0064217 A1 Mar. 5, 2026

(30) Foreign Application Priority Data

Sep. 2, 2024 (KR) ........................ 10-2024-0118568

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 2203/04112* (2013.01)

(58) Field of Classification Search
None
See application file for complete search history.

(56) References Cited

U.S. PATENT DOCUMENTS 12,032,787 B2 7/2024 Hong et al.
2014/0152621 A1* 6/2014 Okayama ............ G06F 3/04182 345/174
2015/0002444 A1* 1/2015 Brunet .................. G06F 3/0446 345/174
2016/0148034 A1* 5/2016 Kremin ............. G06V 40/1306 382/124
2020/0387248 A1* 12/2020 Kim .................... G06F 3/04182
2021/0117012 A1* 4/2021 Kim ..................... H04B 1/3827
2021/0200414 A1* 7/2021 Lee ........................ G06F 3/0418
2021/0263632 A1* 8/2021 Lim .................... G06F 3/04166
2023/0185402 A1* 6/2023 Lee ..................... G06F 3/04184 345/174
2024/0329774 A1 10/2024 Hong et al.

FOREIGN PATENT DOCUMENTS

KR 10-1491203 B1 2/2015
KR 10-2575987 B1 9/2023
KR 10-2024-0031526 A 3/2024
KR 10-2024-0146193 A 10/2024

* cited by examiner

*Primary Examiner* — Christopher R Lamb
(74) *Attorney, Agent, or Firm* — Womble Bond Dickinson (US) LLP

(57) ABSTRACT

An electronic device includes: a sensor layer including a plurality of electrodes arranged in "n" rows and "m" columns; and a sensor driver configured to drive the sensor layer, and wherein the plurality of electrodes include: a plurality of electrodes configured to receive a driving pulse signal located within one of the "m" columns; and a plurality of inversion electrodes configured to receive an inversion pulse signal different from the driving pulse signal, and wherein the sensor driver is configured to determine a number of the plurality of inversion electrodes based on a location of the plurality of electrodes, and wherein, the "n" and the "m" are natural numbers.

19 Claims, 16 Drawing Sheets

ELECTRONIC DEVICE

CROSS-REFERENCE TO RELATED APPLICATION

The present application claims priority to and the benefit of Korean Patent Application No. 10-2024-0118568, filed on Sep. 2, 2024, in the Korean Intellectual Property Office, the entire disclosure of which is incorporated herein by reference.

BACKGROUND

Aspects of some embodiments of the present disclosure described herein relate to an electronic device having a variable number of electrodes within inversion regions.

Multimedia electronic devices such as televisions, mobile phones, tablet computers, navigation systems, game consoles, etc. may display images, and may provide, in addition to general input mechanisms such as buttons, keyboards, mouses, etc., touch-based input methods that allow users to enter information or commands relatively easily and intuitively.

The above information disclosed in this Background section is only for enhancement of understanding of the background and therefore the information discussed in this Background section does not necessarily constitute prior art.

SUMMARY

Aspects of some embodiments of the present disclosure include an electronic device having a variable number of electrodes within inversion regions.

According to some embodiments of the present disclosure, an electronic device includes a sensor layer including a plurality of electrodes arranged in "n" rows and "m" columns, and a sensor driver that drives the sensor layer.

According to some embodiments, the sensor driver provides driving pulse signals to an electrode in a sensing region among the plurality of electrodes, electrodes in a first adjacent region preceding the sensing region in a first direction, and electrodes in a second adjacent region following the sensing region in an opposite direction to the first direction, provides ground signals to an electrode in a first ground region preceding the first adjacent region in the first direction and an electrode in a second ground region following the second adjacent region in the opposite direction to the first direction, and provides inversion pulse signals to electrodes in a first inversion region preceding the first ground region in the first direction and electrodes in a second inversion region following the second ground region in the opposite direction to the first direction.

According to some embodiments, the electrode in the sensing region, the electrodes in the first adjacent region and the second adjacent region, the electrodes in the first ground region and the second ground region, and the electrodes in the first inversion region and the second inversion region are located in one of the "m" columns, where the "n" and the "m" are natural numbers.

According to some embodiments of the present disclosure, an electronic device includes a sensor layer including a plurality of electrodes arranged in "n" rows and "m" columns, and a sensor driver that drives the sensor layer.

According to some embodiments, the plurality of electrodes include an electrode in a sensing region located in one of the "m" columns, electrodes in a first adjacent region preceding the sensing region in a first direction, electrodes in a second adjacent region following the sensing region in an opposite direction to the first direction, electrodes in a first inversion region preceding the first adjacent region in the first direction, electrodes in a second inversion region following the second adjacent region in the opposite direction to the first direction.

According to some embodiments, the first inversion region and the second inversion region each include electrodes arranged in consecutive rows among the "n" rows.

According to some embodiments, the sensor driver determines numbers of electrodes in the first inversion region and the second inversion region, where the "n" and the "m" are natural numbers.

According to some embodiments of the present disclosure, an electronic device includes a sensor layer including a plurality of electrodes arranged in "n" rows and "m" columns, and a sensor driver that drives the sensor layer.

According to some embodiments, the plurality of electrodes include a plurality of electrodes that receive a driving pulse signal located within one of the "m" columns, and a plurality of inversion electrodes that receive an inversion pulse signal different from the driving pulse signal.

According to some embodiments, the sensor driver determines the number of the plurality of inversion electrodes based on a location of the plurality of electrodes, where the "n" and the "m" are natural numbers.

BRIEF DESCRIPTION OF THE DRAWINGS

The above and other aspects and features of some embodiments according to the present disclosure will become more apparent by describing in more detail aspects of some embodiments thereof with reference to the accompanying drawings.

DETAILED DESCRIPTION

Figure 1:
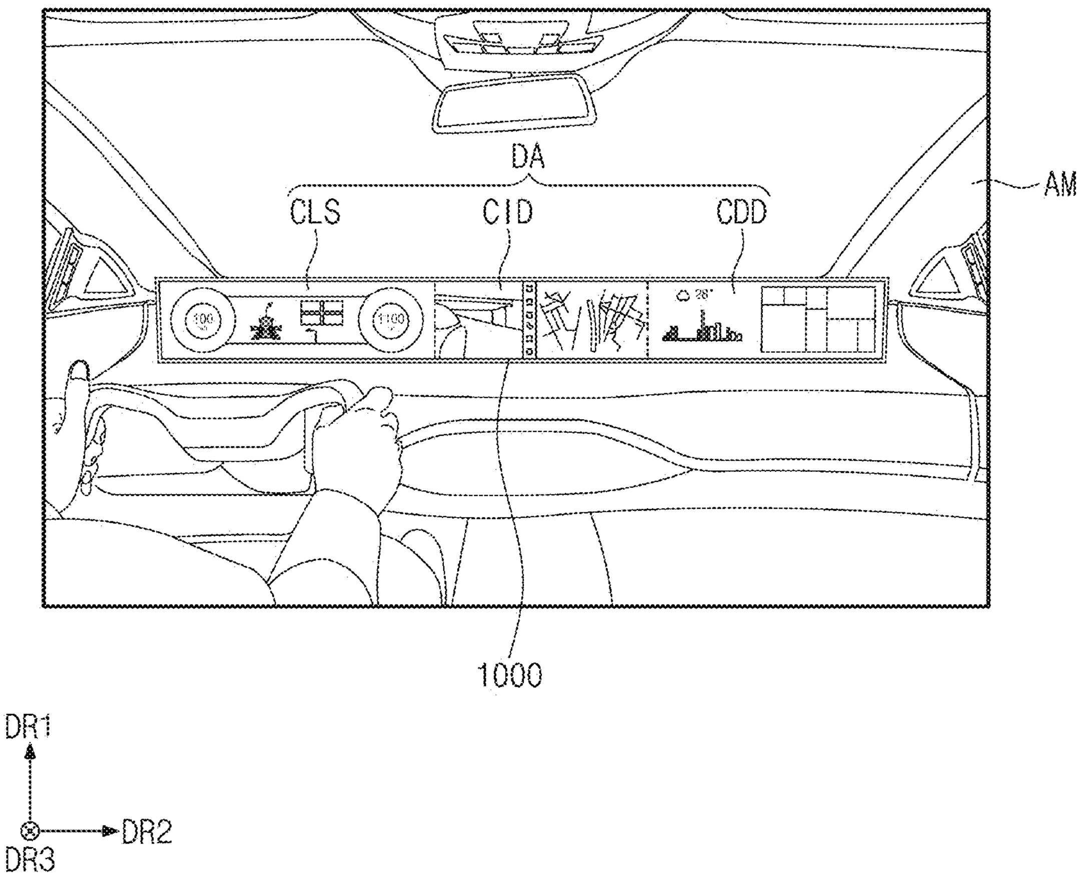
FIG. 1 is a diagram illustrating an interior of a vehicle in which an electronic device is placed, according to some embodiments of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term "and/or" includes one or more combinations that may be defined by the associated components.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, components, or a combination thereof.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

The terms "part" and "unit" mean a software component or a hardware component that performs a specific function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and working components, and may include processes, functions, properties, procedures, subroutines, program code segments, drivers, firmwares, micro-codes, circuits, data, databases, data structures, tables, arrays or variables.

Hereinafter, embodiments of the present disclosure will be described with reference to accompanying drawings.

FIG. 1 is a diagram illustrating an interior of a vehicle AM in which an electronic device 1000 is placed, according to some embodiments of the present disclosure.

Referring to FIG. 1, the electronic device 1000 may be a device that is activated, in response to an electrical signal. For example, the electronic device 1000 may display images on a display area DA. The images may include still images (e.g., static images) as well as dynamic images (e.g., video images).

A display surface on which the images are displayed may correspond to a front surface of the electronic device 1000. The front surface of the electronic device 1000 may be a plane parallel to a first direction DR1 and a second direction DR2. However, embodiments according to the present disclosure are not limited thereto. For example, the front surface of the electronic device 1000 may be the curved electronic device 1000 curved with respect to a direction (e.g., a set or predetermined direction). Alternatively, the front surface of the electronic device 1000 may have various curved shapes corresponding to the shape of an installation target surface of the vehicle AM.

A thickness direction of the electronic device 1000 may be parallel to a third direction DR3 crossing the first direction DR1 and the second direction DR2. Accordingly, a front surface (or a top surface) and a rear surface (or a bottom surface) of members forming the electronic device 1000 may be defined based on the third direction DR3.

According to some embodiments of the present disclosure, the electronic device 1000 may be placed inside the vehicle AM. Accordingly, the display area DA of the electronic device 1000 may include at least one of a cluster area CLS, a central information area CID, or a passenger area CDD. In FIG. 1, the display area DA is illustrated as including all of the cluster area CLS, the central information area CID, and the passenger area CDD, but at least one of them may be omitted.

Various alarm displays indicating a vehicle speed, an engine rotation speed, a driving distance, a fuel status, and whether the vehicle AM is operating normally may be displayed in the cluster area CLS. Various vehicle operation information such as navigation information, audio, and heating/cooling may be displayed in the central information area CID. The passenger area CDD is a display area for the passenger seat, and not only information related to driving the vehicle AM, but also various information unrelated to driving the vehicle AM may be displayed.

The electronic device 1000 may include a sensor layer. For example, the electronic device 1000 may include a sensor layer capable of receiving an input signal from a user. In some embodiments, the electronic device 1000 may include a sensor layer capable of receiving an input signal from a user in a Multi-Cap manner or a Self-dot manner.

Figure 2:
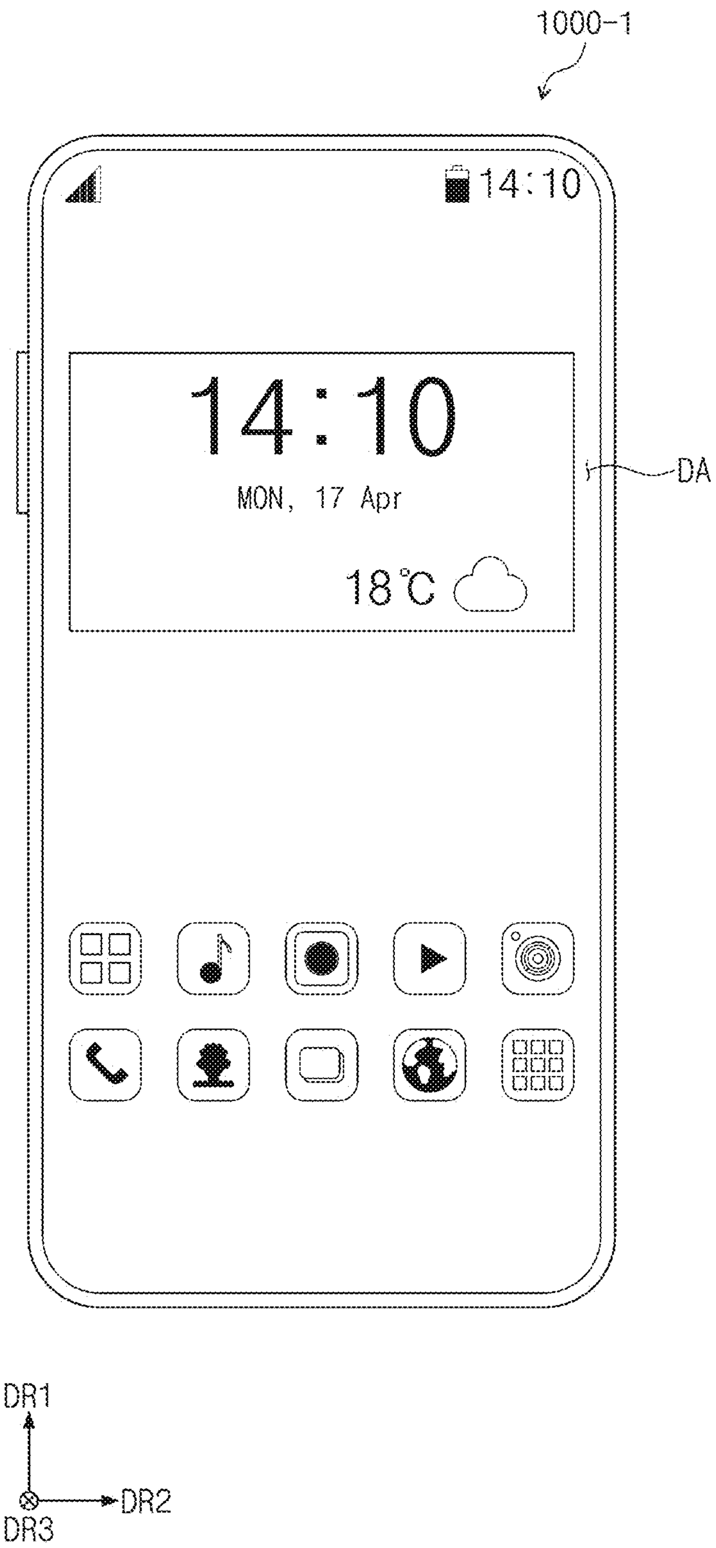
FIG. 2 is a plan view of an electronic device, according to some embodiments of the present disclosure.

FIG. 2 is a plan view of an electronic device 1000-1, according to some embodiments of the present disclosure.

Referring to FIG. 2, the electronic device 1000-1 may be applied to electronic devices such as a mobile phone, a tablet, a smart watch, a laptop computer, a computer, or a smart television. In FIG. 2, a mobile phone is illustrated as an example.

According to some embodiments of the present disclosure, the electronic device 1000-1 may display an image through the display area DA. The display area DA may include a surface defined by the first direction DR1 and the second direction DR2.

Although FIG. 2 illustrates the electronic device 1000 of a bar type, by way of example, embodiments according to the present disclosure are not limited thereto. For example, the descriptions to be described below may be applied to various electronic devices such as the foldable electronic device 1000, the rollable electronic device 1000, or the slidable electronic device 1000.

Figure 3:
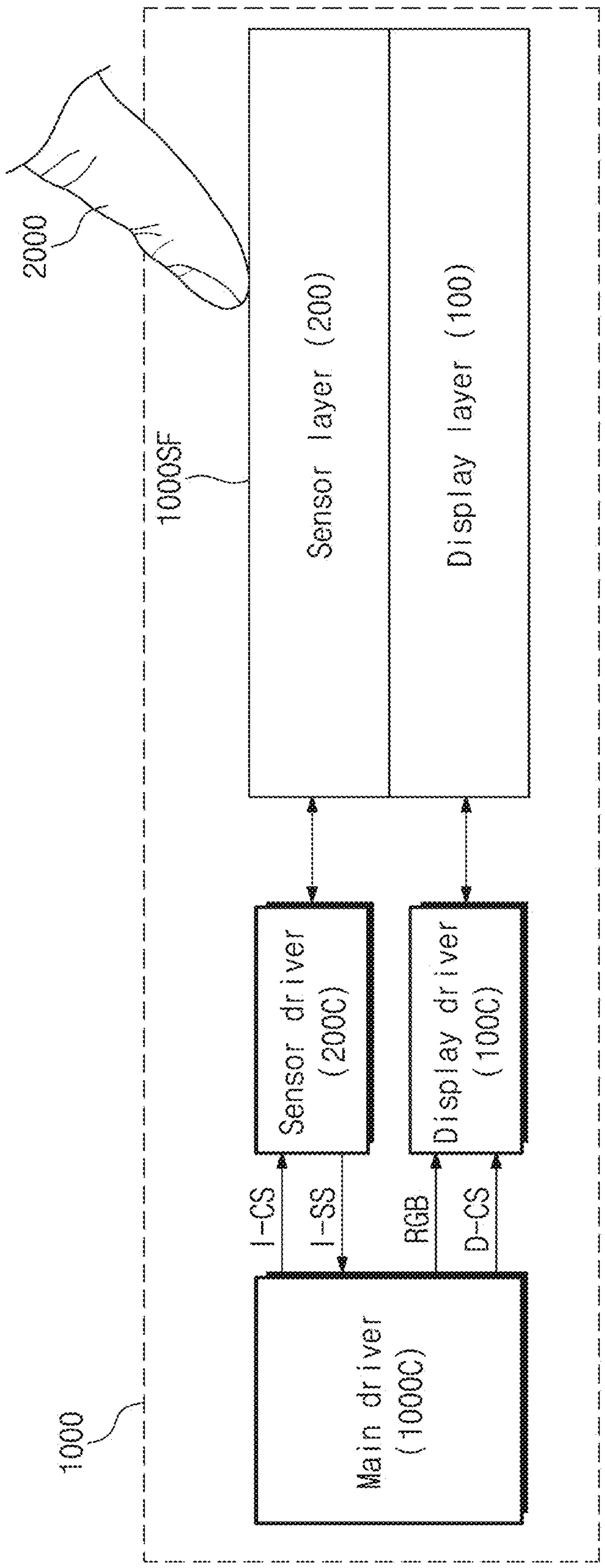
FIG. 3 is a diagram for describing an operation of an electronic device, according to some embodiments of the present disclosure.

FIG. 3 is a diagram for describing an operation of the electronic device 1000, according to some embodiments of the present disclosure.

Referring to FIG. 3, the electronic device 1000 may include a display layer 100, a sensor layer 200, a display driver 100C, a sensor driver 2000, and a main driver 1000C.

The display layer 100 may be a component which actually generates an image. The display layer 100 may be a light emitting display layer, for example, the display layer 100 may include an organic light emitting display layer, an inorganic light emitting display layer, an organic-inorganic light emitting display layer, a quantum dot display layer, a micro LED display layer, or a nano LED display layer.

The sensor layer 200 may be located on the display layer 100. The sensor layer 200 may sense an external input (e.g., 2000) applied from the outside. The external input 2000 may include any input means capable of providing a change in capacitance. For example, the sensor layer 200 may sense not only a passive type input means such as a user's body, but also an input by an active type input means providing a driving signal.

The main driver 1000C may control the overall operation of the electronic device 1000. For example, the main driver 1000C may control operations of the display driver 100C and the sensor driver 2000. The main driver 1000C may include at least one microprocessor, and may further include a graphics controller. The main driver 1000C may be referred to as an application processor, a central processing unit, or a main processor.

The display driver 100C may drive the display layer 100. The display driver 100C may receive image data RGB and a control signal D-CS from the main driver 1000C. The control signal D-CS may include various signals. For example, the control signal D-CS may include an input vertical synchronization signal, an input horizontal synchronization signal, a main clock, a data enable signal, etc. The display driver 1000 may generate the vertical synchronization signal and the horizontal synchronization signal that control the timing of providing a signal to the display layer 100, based on the control signal D-CS.

The sensor driver 2000 may drive the sensor layer 200. The sensor driver 2000 may receive a control signal I-CS from the main driver 1000C. The control signal I-CS may include a mode determination signal for determining an operation mode of the sensor driver 2000 and a clock signal.

The sensor driver 2000 may calculate coordinate information of an input based on a signal received from the sensor layer 200 and may provide a coordinate signal I-SS including the coordinate information to the main driver 1000C. The main driver 1000C allows an operation corresponding to a user input to be executed based on the coordinate signal I-SS. For example, the main driver 1000C may operate the display driver 1000 such that a new application image is displayed on the display layer 100.

Figure 4A:
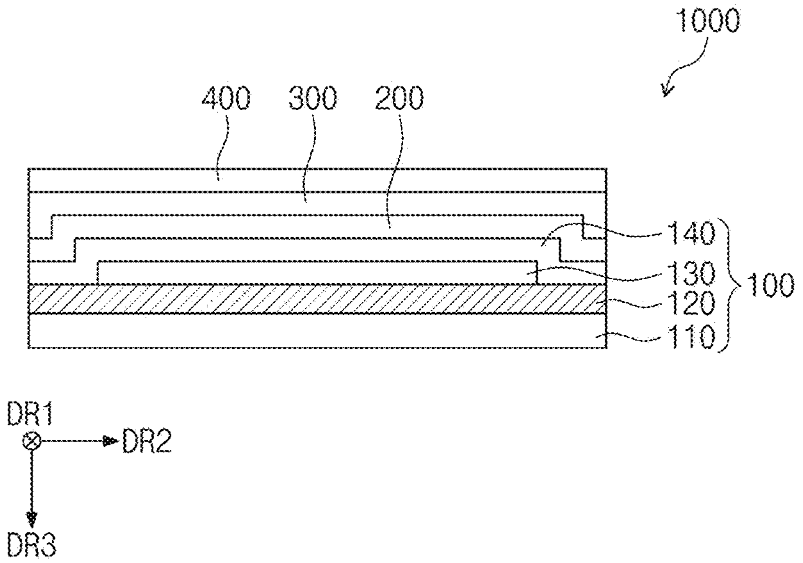
FIG. 4A is a cross-sectional view of an electronic device, according to some embodiments of the present disclosure.

FIG. 4A is a cross-sectional view of the electronic device 1000, according to some embodiments of the present disclosure.

Referring to FIG. 4A, the electronic device 1000 may include the display layer 100, the sensor layer 200, an anti-reflection layer 300, and a window 400.

The display layer 100 may include a base layer 110, a circuit layer 120, a light emitting element layer 130, and an encapsulation layer 140.

The base layer 110 may be a member that provides a base surface on which the circuit layer 120 is located. The base layer 110 may be a glass substrate, a metal substrate, a polymer substrate, or the like. However, the embodiments according to the present disclosure are not limited thereto, but the base layer 110 may be an inorganic layer, an organic layer, or a composite material layer.

The circuit layer 120 may be located on the base layer 110. The circuit layer 120 may include an insulating layer, a semiconductor pattern, a conductive pattern, and a signal line. An insulating layer, a semiconductor layer, and a conductive layer may be formed on the base layer 110 through a coating or deposition process, and the insulating layer, the semiconductor layer, and the conductive layer may then be selectively patterned through a plurality of photolithography processes. Thereafter, the semiconductor pattern, the conductive pattern, and the signal line included in the circuit layer 120 may be formed.

The light emitting element layer 130 may be located on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be located on the light emitting element layer 130. The encapsulation layer 140 may protect the light emitting element layer 130 from foreign substances such as moisture, oxygen, and dust particles.

The sensor layer 200 may be located on the display layer 100. The sensor layer 200 may be formed on the display layer 100 through a successive process. In this case, the sensor layer 200 may be expressed as being directly located on the display layer 100. The wording "~being directly located-" may indicate that a third component is not intervened between the sensor layer 200 and the display layer 100. In other words, an additionally adhesive member may not be interposed between the sensor layer 200 and the display layer 100. Alternatively, the sensor layer 200 may be bonded to the display layer 100 through an adhesive member. The adhesive member may include a typical adhesive or a sticking agent.

The anti-reflection layer 300 may be located on the sensor layer 200. The anti-reflection layer 300 may reduce reflectance of external light incident from the outside of the electronic device 1000. The anti-reflection layer 300 may be located directly on the sensor layer 200. However, it is not limited thereto, and an adhesive material may be placed between the anti-reflection layer 300 and the sensor layer 200.

The window 400 may be located above the anti-reflection layer 300. The window 400 may include an optically transparent insulating material. For example, the window 400 may include glass or plastic. The window 400 may have a multi-layer structure or a single-layer structure. For example, the window 400 may include a plurality of plastic films bonded to each other by an adhesive or may include a glass substrate and a plastic film bonded to each other by an adhesive.

Figure 4B:
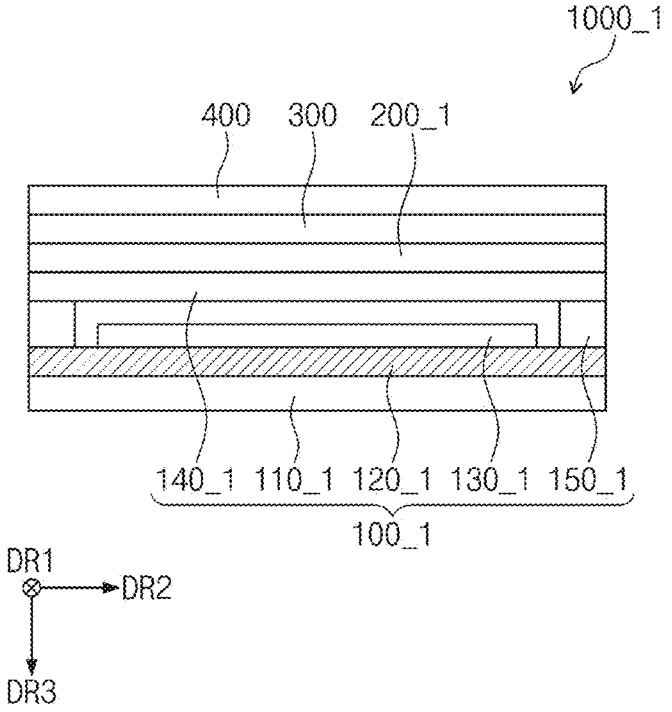
FIG. 4B is a cross-sectional view of an electronic device, according to some embodiments of the present disclosure.

FIG. 4B is a cross-sectional view of an electronic device 1000_1, according to some embodiments of the present disclosure.

Referring to FIG. 4B, the electronic device 1000_1 may include a display layer 100_1, a sensor layer 200_1, the anti-reflection layer 300, and the window 400.

The display layer 100_1 may include a base substrate 110_1, a circuit layer 1201, a light emitting element layer 130_1, an encapsulation substrate 140_1, and a coupling member 150_1.

Each of the base substrate 110_1 and the encapsulation substrate 140_1 may be a glass substrate, a metal substrate, or a polymer substrate, but is not particularly limited thereto.

The coupling member 150_1 may be located between the base substrate 110_1 and the encapsulation substrate 140_1. The coupling member 150_1 may couple the encapsulation substrate 140_1 to the base substrate 110_1 or the circuit layer 120_1. The coupling member 1501 may include an inorganic material or an organic material. For example, the inorganic material may include a frit seal, and the organic material may include a photo-curable resin or a photo-plastic resin. However, the material constituting the coupling member 150_1 is not limited to the above example.

The sensor layer 200_1 may be directly located on the encapsulation substrate 140_1. The wording "~being directly located~" may indicate that a third component is not intervened between the sensor layer 200_1 and the encapsulation substrate 140_1. That is, a separate adhesive member may not be located between the sensor layer 2001 and the display layer 100_1. However, embodiments according to the present disclosure are not limited thereto, and an adhesive layer may be further located between the sensor layer 200_1 and the encapsulation substrate 140_1.

Figure 5:
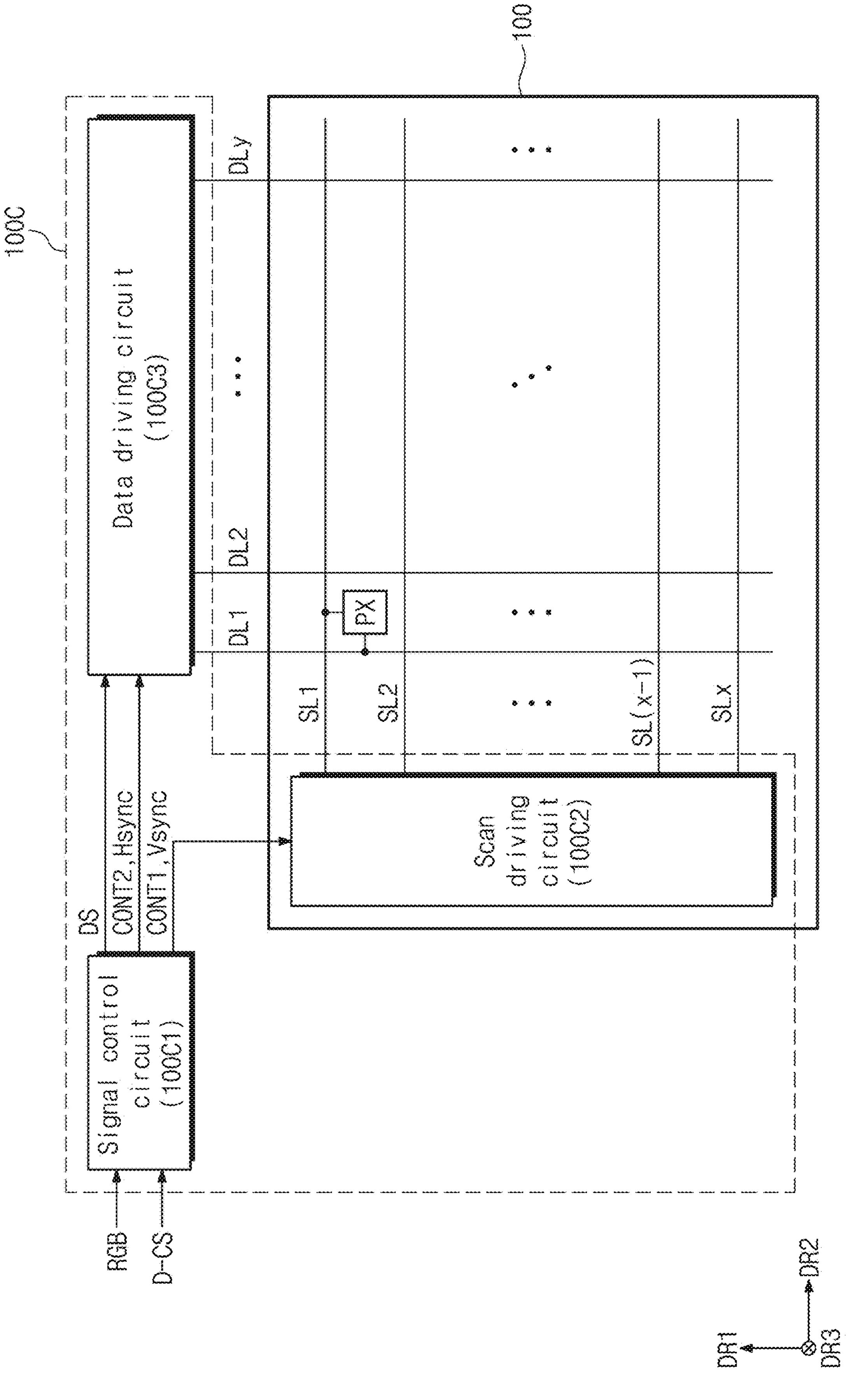
FIG. 5 is a block diagram of a display layer and a display driver according to some embodiments of the present disclosure.

FIG. 5 is a block diagram of the display layer 100 and the display driver 100C, according to some embodiments of the present disclosure.

Referring to FIG. 5, the display layer 100 may include a plurality of scan lines SL1 to SLx, a plurality of data lines DL1 to DLy, and a plurality of pixels PX. Although FIG. 5 illustrates a single pixel PX, as a person having ordinary skill in the art would appreciate, the display layer 100 may include any suitable number of pixels PX according to the design and size of the display layer 100.

Each of the plurality of pixels PX is connected with a corresponding data line of the plurality of data lines DL1 to DLy and is connected with a corresponding scan line of the plurality of scan lines SL1 to SLx. Here, the 'x' may be an integer greater than or equal to 2, and the 'y' may be an integer greater than or equal to 2. According to some embodiments of the present disclosure, the display layer 100 may further include light emission control lines, and the display driver 100C may further include a light emission driving circuit that provides control signals to the light emission control lines. The configuration of the display layer 100 is not particularly limited.

Each of the scan lines SL1 to SLx may extend in the second direction DR2, and the scan lines SL1 to SLx may be arranged to be spaced apart from each other in the first direction DR1. Each of the data lines DL1 to DLy may extend in the first direction DR1, and the data lines DL1 to DLy may be arranged to be spaced apart from each other in the second direction DR2.

The display driver 100C may include a signal control circuit 100C1, a scan driving circuit 100C2, and a data driving circuit 100C3.

The signal control circuit 100C1 may receive the image data RGB and the control signal D-CS from the main driver 1000C (refer to FIG. 2). The control signal D-CS may include various signals. For example, the control signal D-CS may include an input vertical synchronization signal, an input horizontal synchronization signal, a main clock, a data enable signal, etc.

The signal control circuit 100C1 may generate a first control signal CONT1 and a vertical synchronization signal Vsync based on the control signal D-CS, and may output the first control signal CONT1 and the vertical synchronization signal Vsync to the scan driving circuit 100C2.

The signal control circuit 100C1 may generate a second control signal CONT2 and a horizontal synchronization signal Hsync based on the control signal D-CS, and may output the second control signal CONT2 and the horizontal synchronization signal Hsync to the data driving circuit 100C3.

In addition, the signal control circuit 100C1 may output a driving signal DS obtained by processing the image data RGB to match to the operating condition of the display layer 100 to the data driving circuit 100C3. The first control signal CONT1 and the second control signal CONT2 are signals necessary for the operation of the scan driving circuit 100C2 and the data driving circuit 100C3, and are not particularly limited thereto.

The scan driving circuit 100C2 drives the plurality of scan lines SL1 to SLx in response to the first control signal CONT1 and the vertical synchronization signal Vsync. According to some embodiments of the present disclosure, the scan driving circuit 100C2 may be formed in the same process as a circuit layer in the display layer 100, but is not limited thereto. For example, the scan driving circuit 100C2 may be implemented as an integrated circuit (IC) and may be directly mounted on an area (e.g., a set or predetermined area) of the display layer 100 or on a separate printed circuit board in a chip-on-film (COF) manner to be electrically connected with the display layer 100.

The data driving circuit 10003 may output a grayscale voltage to the plurality of data lines DL1 to DLy in response to the second control signal CONT2, the horizontal synchronization signal Hsync, and the driving signal DS from the signal control circuit 10001. The data driving circuit 10003 may be implemented as an integrated circuit and may be directly mounted on an area (e.g., a set or predetermined area) of the display layer 100 or on a separate printed circuit board in a chip-on-on-film manner to be electrically connected to the display layer 100, but is not particular limited thereto. For example, the data driving circuit 10003 may be formed in the same process as the circuit layer in the display layer 100.

Figure 6:
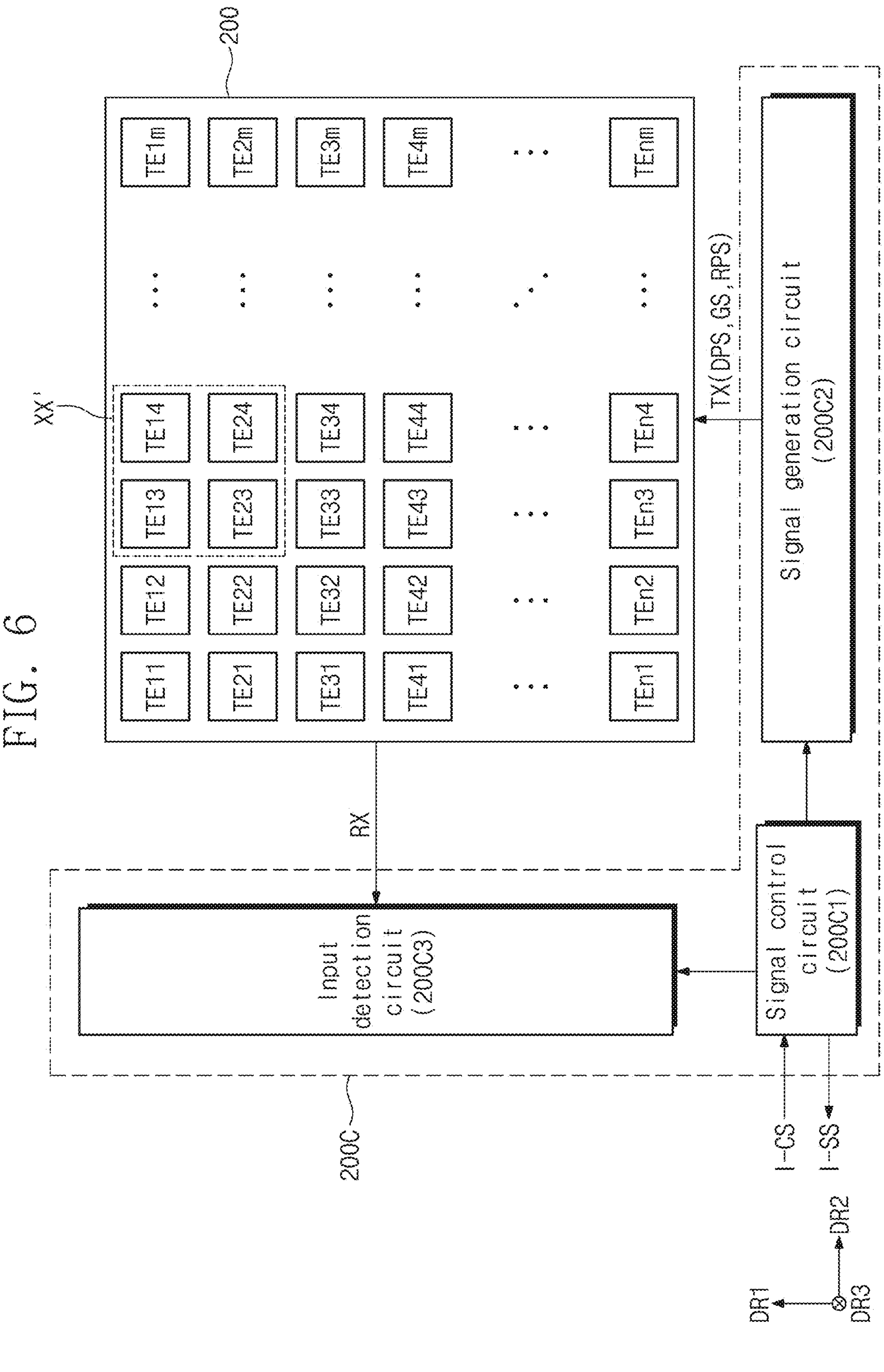
FIG. 6 is a block diagram of a sensor layer and a sensor driver, according to some embodiments of the present disclosure.

FIG. 6 is a block diagram of the sensor layer 200 and the sensor driver 2000, according to some embodiments of the present disclosure.

Referring to FIG. 6, the sensor layer 200 may include a plurality of electrodes TE11 to TEnm. The plurality of electrodes TE11 to TEnm may be arranged in "n" rows and "m" columns. According to some embodiments, the sensor layer 200 may further include a plurality of signal lines connected to the plurality of electrodes TE11 to TEnm. Here, the 'n' may be an integer greater than or equal to 2, and the 'm' may be an integer greater than or equal to 2.

One row may include electrodes arranged in the second direction DR2 among the plurality of electrodes TE11 to TEnm. For example, one row may include "m" electrodes. The "m" electrodes may each form rows extending along the second direction DR2 and may be arranged to be spaced apart from each other. In addition, one column may include electrodes arranged in the opposite direction of the first direction DR1 among the plurality of electrodes TE11 to TEnm. The one column may include "n" electrodes. The "n" electrodes may each form columns extending along the opposite direction of the first direction DR1 and may be arranged to be spaced apart from each other. In FIG. 6, the rectangular sensor layer 200 including the plurality of electrodes TE11 to TEnm arranged in "n" rows and "m" columns is illustrated as an example, but the shape of the sensor layer 200 is not limited thereto. The sensor layer 200 may be applied in various shapes such as circular, oval, and irregular shapes.

According to some embodiments of the present disclosure, the plurality of electrodes TE11 to TEnm may operate in one of a plurality of operation modes. For example, the plurality of operation modes may include a sensing mode, a driving mode, a ground mode, and an inversion mode. The plurality of electrodes TE11 to TEnm may operate in one of the sensing mode, the driving mode, the ground mode, and the inversion mode.

According to some embodiments of the present disclosure, an electrode operating in the sensing mode among the plurality of electrodes TE11 to TEnm may detect an external input (for example, 2000 of FIG. 3) applied from the outside. The external input (2000 of FIG. 3) may include all input means capable of providing a change in electrostatic capacitance.

According to some embodiments of the present disclosure, the electrodes operating in the sensing mode or the driving mode may receive a driving pulse signal DPS. In addition, the electrode operating in the ground mode may receive a ground signal GS and may be connected to a ground terminal in response to the ground signal GS. Finally, the electrodes operating in the inversion mode may receive an inversion pulse signal RPS. A more detailed description of the plurality of operation modes will be described below.

According to some embodiments of the present disclosure, the sensor driver 2000 may receive the control signal I-CS from the main driver 1000C (refer to FIG. 3). In a touch sensing mode, the sensor driver 2000 may provide the coordinate signal I-SS to the main driver 1000C (refer to FIG. 3).

The sensor driver 2000 is implemented as an integrated circuit (IC) and is directly mounted on an area (e.g., a set or predetermined area) of the sensor layer 200 or on a separate printed circuit board in a chip-on-film (COF) manner to be electrically connected to the sensor layer 200.

The sensor driver 2000 may include a sensor control circuit 20001, a signal generation circuit 20002, and an input detection circuit 20003. The sensor control circuit 20001 may control operations of the signal generation circuit 20002 and the input detection circuit 20003 based on the control signal I-CS.

The signal generation circuit 20002 may output transmission signals TX to the plurality of electrodes TE11 to TEnm of the sensor layer 200. The input detection circuit 20003 may receive detection signals RX from the sensor layer 200. For example, the input detection circuit 20003 may receive the detection signals RX from the plurality of electrodes TE11 to TEnm.

The signal generation circuit 20002 may be located in the first direction DR1 from one edge of the sensor layer 200. In detail, the signal generation circuit 20002 may be located so as to be spaced apart from each row of the plurality of electrodes TE11 to TEnm by different distances. For example, the signal generation circuit 20002 may be located so as to be spaced apart from the electrodes TE11 to TE1*m* of a first row by a first distance, and may be located so as to be spaced apart from the electrodes TEn1 to TEnm of an n-th row by a second distance. The first distance may be greater than the second distance.

The input detection circuit 20003 may convert an analog signal into a digital signal. For example, the input detection circuit 20003 may amplify and then filter a received analog signal. In detail, the input detection circuit 20003 may convert the filtered signal into a digital signal.

According to some embodiments of the present disclosure, the signal generation circuit 20002 may sequentially output the transmission signal TX to the plurality of electrodes TE11 to TEnm. The input detection circuit 200C3 may receive the detection signal RX from a corresponding electrode whenever the transmission signal TX is provided to each of corresponding plurality of electrodes TE11 to TEnm. Therefore, the sensor driver 2000 may detect coordinate information of the input (2000, refer to FIG. 2). For example, when one of the plurality of electrodes TE11 to TEnm becomes a sensing electrode, the transmission signal TX, particularly the driving pulse signal DPS to be described later, is provided to the corresponding sensing electrode, and then the detection signal RX may be received from the corresponding sensing electrode.

According to some embodiments of the present disclosure, intensities of the transmission signals TX received by each of the plurality of electrodes TE11 to TEnm from the signal generation circuit 200C2 may be variable based on the distances between the signal generation circuit 200C2 and the plurality of electrodes TE11 to TEnm. For example, the intensities of the transmission signals TX received by the electrodes TE11 to TE1*m* of a first row may be weaker than the intensities of the transmission signals TX received by the electrodes TEn1 to TEnm of an n-th row. The intensities of the transmission signals TX may indicate absolute values of the peak values of the driving pulse signal DPS and the inversion pulse signal RPS.

The transmission signals TX may determine the operation modes of the plurality of electrodes TE11 to TEnm, respectively. The transmission signals TX may include the driving pulse signal DPS, the ground signal GS, and the inversion pulse signal RPS. The driving pulse signal DPS may include a plurality of pulses rising from a ground voltage to a positive driving voltage (or a logic high level). The ground signal GS may be a signal that allows the plurality of electrodes TE11 to TEnm to be connected to the ground electrodes. The inversion pulse signal RPS may include a plurality of pulses falling from the ground voltage to a negative driving voltage (or a logic low level).

Figure 7:
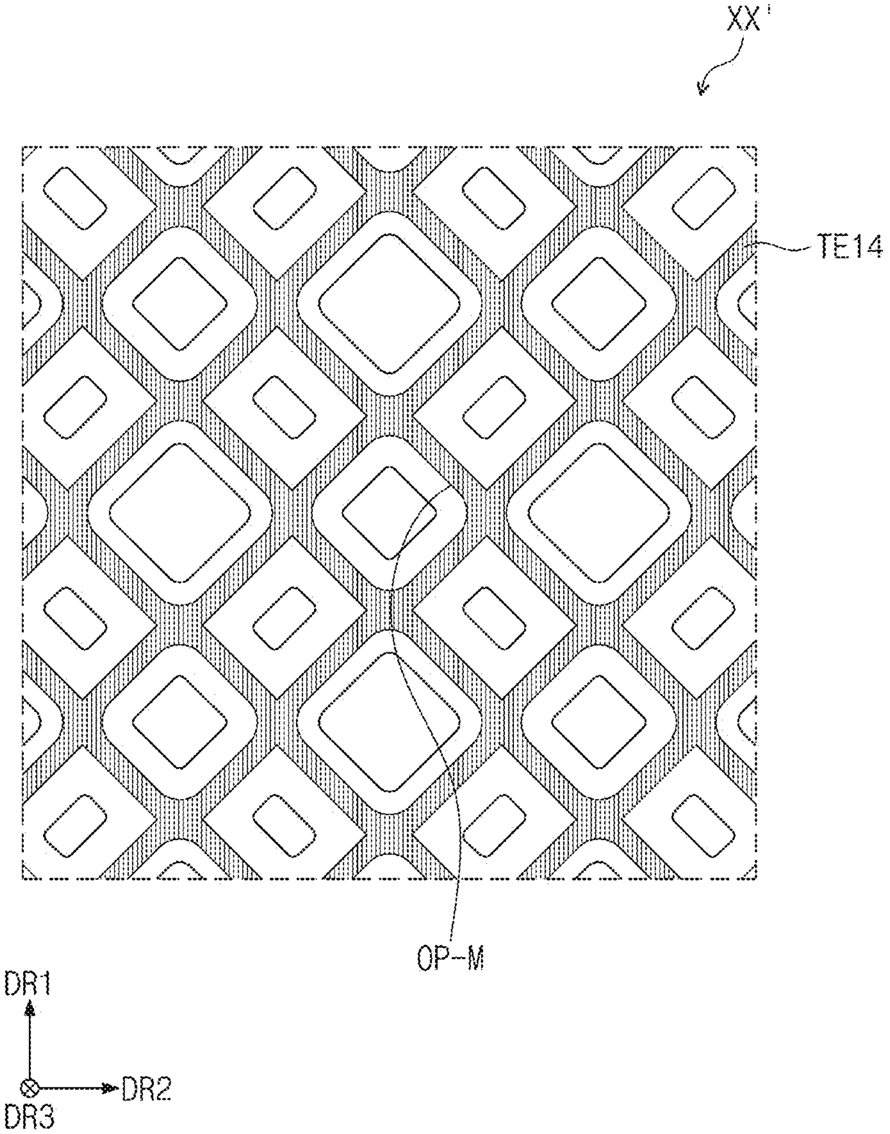
FIG. 7 is a diagram for describing a mesh structure of a sensor layer, according to some embodiments of the present disclosure.

FIG. 7 is a diagram for describing a mesh structure of the sensor layer 200, according to some embodiments of the present disclosure.

Referring to FIGS. 6 and 7, the sensor layer 200 may have a mesh structure. An aperture OP-M may be defined in the sensor layer 200. The sensor layer 200 may include a plurality of openings OP-M. However, this is only an example, and the sensor layer 200 may have one of various types of mesh structures.

Figure 8:
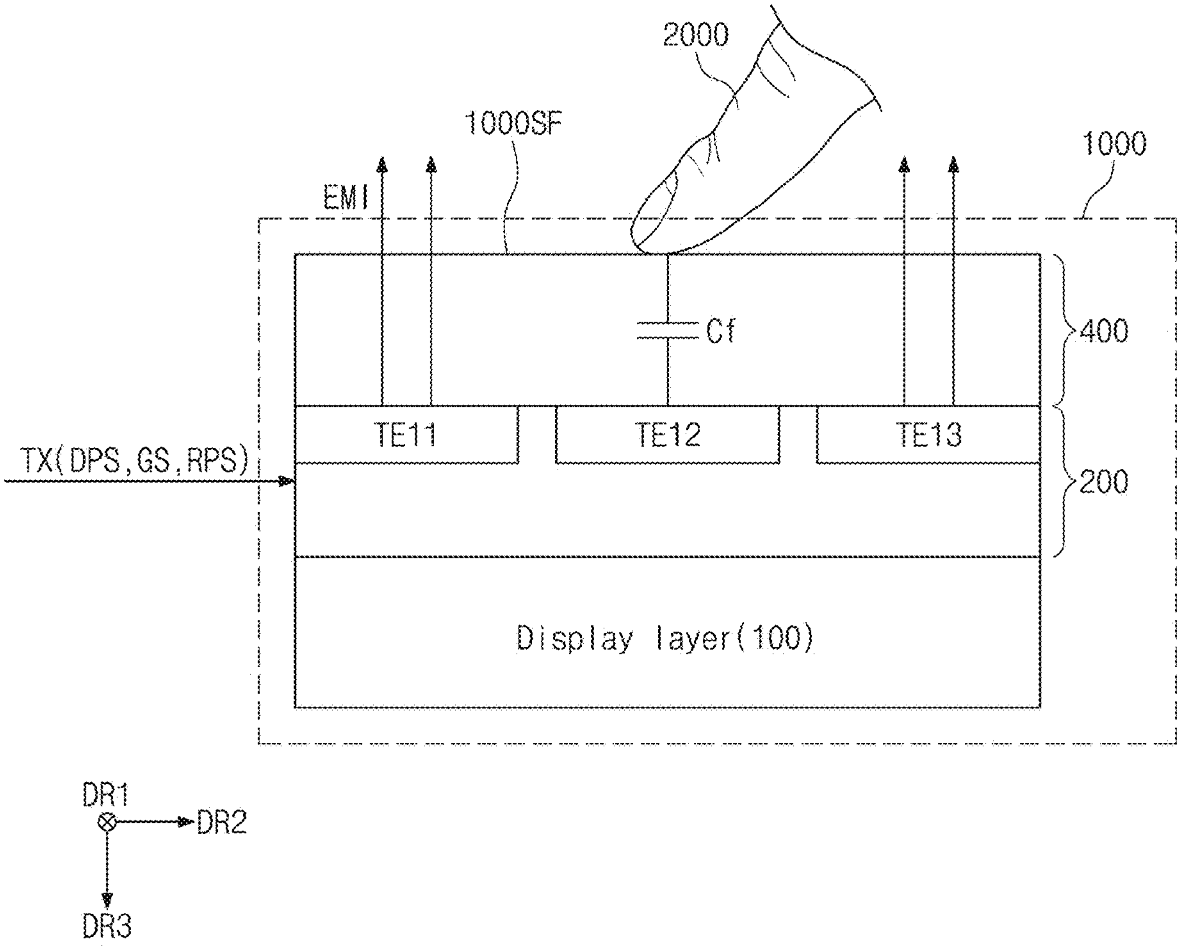
FIG. 8 is a cross-sectional view of an electronic device, according to some embodiments of the present disclosure.

FIG. 8 is a cross-sectional view illustrating the electronic device 1000, according to some embodiments of the present disclosure.

Referring to FIG. 8, the electronic device 1000 according to some embodiments of the present disclosure may include the display layer 100, the sensor layer 200, and the window 400.

The sensor layer 200 may include a first electrode TE11, a second electrode TE12, and a third electrode TE13, which are arranged in a first column. The first electrode TE11, the second electrode TE12, and the third electrode TE13 may receive one of the transmission signals TX (e.g., one of the driving pulse signal DPS, the ground signal GS, and the inversion pulse signal RPS), respectively.

According to some embodiments of the present disclosure, the first electrode TE11, the second electrode TE12, and the third electrode TE13 may each receive driving pulse signals DPS. When a driving voltage by driving pulse signals DPS is applied to the first electrode TE11, the second electrode TE12, and the third electrode TE13, a parasitic capacitance Cf may be generated between (e.g., in the window 400) the sensor layer 200 and the external input 2000. An Electro Magnetic Interference (EMI) may be generated by the wires, electrodes (e.g., the first electrode TE11, the second electrode TE12, and the third electrode TE13) within the electronic device 1000 to which the parasitic capacitance Cf and the driving pulse signal DPS are applied. The EMI may affect the operations of the electronic device 1000 and external electronic devices that may be driven together with the electronic device 1000.

To minimize or reduce the EMI, the inversion pulse signals RPS may be provided to the sensor layer 200. For example, to minimize or reduce the EMI, electrodes receiving the inversion pulse signals RPS may be applied with a negative driving voltage to offset the positive driving voltage of the drive pulse signals DPS. A more detailed description of the inversion pulse signals RPS will be described later with reference to FIG. 9.

Figure 9:
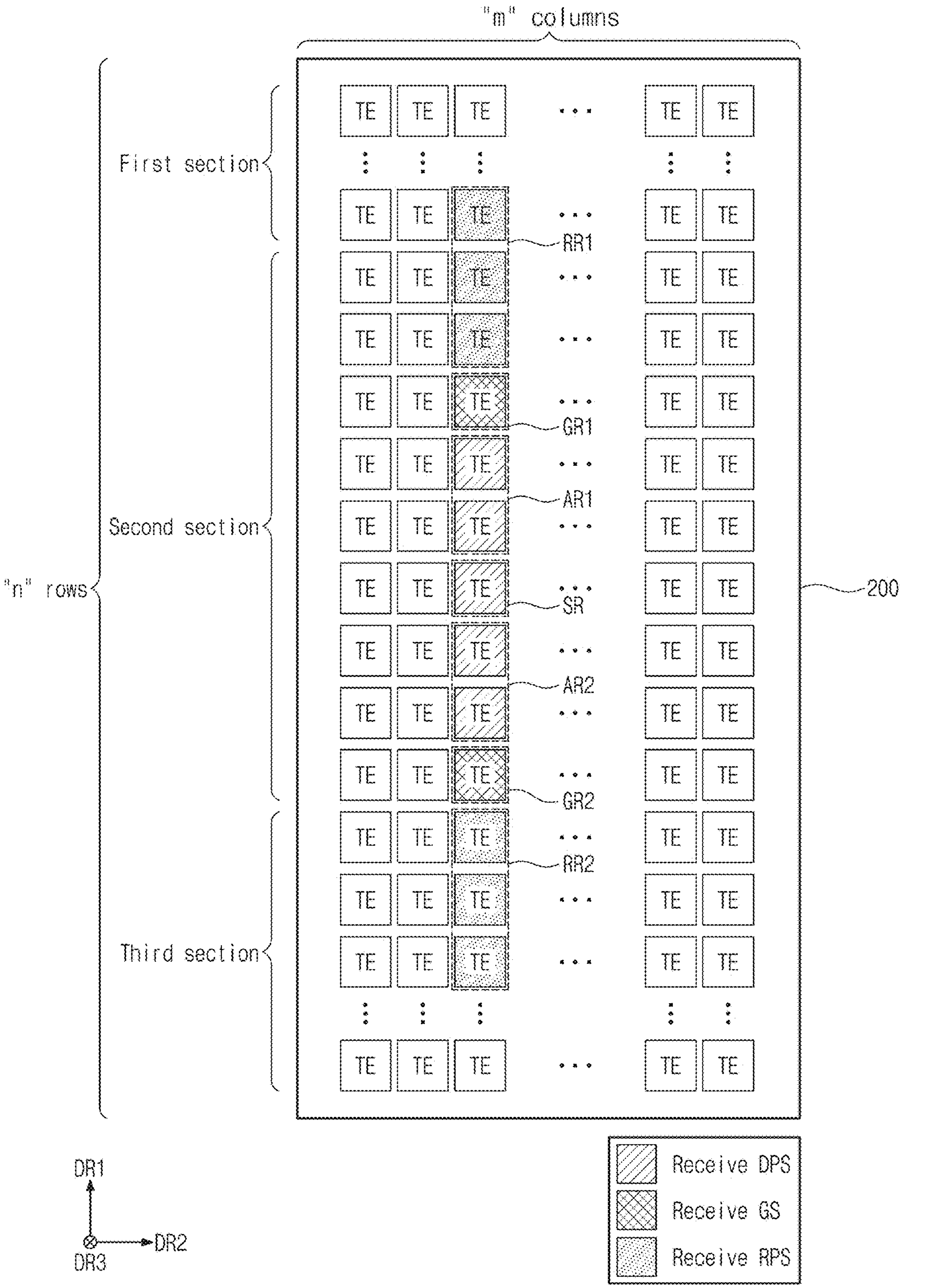
FIG. 9 is a diagram for describing a sensor layer, according to some embodiments of the present disclosure.

FIG. 9 is a diagram for describing the sensor layer 200, according to some embodiments of the present disclosure.

Referring to FIG. 9, the sensor layer 200 may include a plurality of electrodes TE. For example, the sensor layer 200 may include the plurality of electrodes TE arranged in "n" rows and "m" columns.

Some of the plurality of electrodes TE may be in a sensing region SR, a first adjacent region AR1, a second adjacent region AR2, a first ground region GR1, a second ground region GR2, a first inversion region RR1, and a second inversion region RR2.

The electrode TE in the sensing region SR may operate in a sensing mode. The electrode TE in the sensing region SR may detect the external input 2000 of FIG. 3 and may provide the detection signal RX to the input detection circuit 200C3 of FIG. 6. For example, the electrode TE in the sensing region SR may detect the external input 2000 of FIG. 3 based on the driving pulse signal DPS and may provide the detection signal RX indicating the result of detecting the external input 2000 to the input detection circuit 200C3 of FIG. 6. The electrode TE in the sensing region SR is illustrated as one by way of example, but may be two or more.

The electrodes TE in the first adjacent region AR1 and the second adjacent region AR2 may each receive the driving pulse signals DPS. In addition, the electrodes TE in the first adjacent region AR1 and the second adjacent region AR2 may operate in a driving mode. For example, the electrodes TE in the first adjacent region AR1 and the second adjacent region AR2 may be applied with a positive driving voltage by the driving pulse signals DPS.

The first adjacent region AR1 may precede the sensing region SR in the first direction DR1. In addition, the second adjacent region AR2 may follow the sensing region SR in the opposite direction to the first direction DR1. Although the number of electrodes TE in the first adjacent region AR1 and the second adjacent region AR2 is illustrated as two by way of example, they may be one or three or more.

According to some embodiments of the present disclosure, preceding a k-th row in the first direction DR1 may refer to being located in the (k−1)-th row. Here, the "k" is any natural number. However, when the "k" is 1, preceding a first row in the first direction DR1 may refer to being located in an n-th row (i.e., the last row).

In addition, following the k-th row in the opposite direction to the first direction DR1 may refer to being located in the (k+1)-th row. However, when "k" is "n", the following of the n-th row in the opposite direction of the first direction DR1 may refer to being located in the first row.

The electrodes TE in the first ground region GR1 and the second ground region GR2 may each receive the ground signal GS. In addition, the electrodes TE in the first ground region GR1 and the second ground region GR2 may operate in a ground mode. For example, the electrodes TE in the first ground region GR1 and the second ground region GR2 may be respectively connected to the ground electrodes based on the ground signal GS.

According to some embodiments of the present disclosure, the electrodes in the first ground region GR1 and the second ground region GR2 may be respectively connected to the ground electrodes, thereby being used to distinguish between a touch by water and a touch by a finger. Therefore, the electrodes in the first ground region GR1 and the second ground region GR2 may minimize or reduce touch malfunction due to water.

The first ground region GR1 may precede the first adjacent region AR1 in the first direction DR1. In addition, the second ground region GR2 may follow the second adjacent region AR2 in the opposite direction to the first direction DR1. The electrodes TE in the first ground region GR1 and the second ground region GR2 are illustrated as one each by way of example, but may be two or more.

The electrodes TE in the first inversion region RR1 and the second inversion region RR2 may each receive the inversion pulse signals RPS. In addition, the electrodes TE in the first inversion region RR1 and the second inversion region RR2 may operate in an inversion mode. For example, the electrodes TE in the first inversion region RR1 and the second inversion region RR2 may each be applied with a negative driving voltage by the inversion pulse signals RPS. The electrodes TE in the first inversion region RR1 and the second inversion region RR2 may be referred to as inversion electrodes.

The first inversion region RR1 may precede the first ground region GR1 in the first direction DR1. In addition, the second inversion region RR2 may follow the second ground region GR2 in the opposite direction to the first direction DR1. The number of electrodes TE in the first inversion region RR1 and the second inversion region RR2 are illustrated as three by way of example, but are not limited to three as will be described later with reference to FIGS. 10A to 10C.

According to some embodiments of the present disclosure, depending on the location of the sensing region SR, the first inversion region RR1 or the second inversion region RR2 may be located far from the first adjacent region AR1 or the second adjacent region AR2. For example, when the first ground region GR1 is located in the first row, the first inversion region RR1 preceding the first ground region GR1 in the first direction DR1 may be located in an (n−2)-th row to the n-th row (when the number of electrodes in the first inversion region RR1 is three). In addition, when the first ground region GR1 is located in the second row, the first inversion region RR1 may be located in the first row, an (n−1)-th row, and the n-th row (when the number of electrodes in the first inversion region RR1 is three).

In addition, when the second ground region GR2 is located in the n-th row, the second inversion region RR2 following the second ground region GR2 in the opposite direction to the first direction DR1 may be located in the first row to the third row (when the number of electrodes in the second inversion region RR2 is three). In addition, when the second ground region GR2 is located in the (n−1)-th row, the second inversion region RR2 may be located in the n-th row, the first row, and a second row (when the number of electrodes in the second inversion region RR2 is three).

When the number of electrodes in the sensing region SR, the number of electrodes in the first adjacent region AR1, and the number of electrodes in the first ground region GR1 are each fixed, the location of the first inversion region RR1 may be determined based on the location of the sensing region SR. Therefore, the sensor driver 2000 of FIG. 6 may determine the number of electrodes in the first inversion region RR1 based on the row in which the sensing region SR is located.

Although the number of electrodes in the first inversion region RR1 is described by way of example, the number of electrodes in the second inversion region RR2 may also be determined based on the row in which the sensing region SR is located.

According to some embodiments of the present disclosure, the “n” rows may include a plurality of sections (e.g., a first section, a second section, and a third section). For example, when the sensing region SR is in the first section, all or some of the electrodes in the first inversion region RR1 may be located (e.g., the n-th row) far from the first adjacent region AR1. In addition, when the sensing region SR is in the second section, the electrodes in each of the first inversion region RR1 and the second inversion region RR2 may be located adjacent to the electrodes in each of the first adjacent region AR1 and the second adjacent region AR2. Finally, when the sensing region SR is in the third section, all or some of the electrodes in the second inversion region RR2 may be located (e.g., the first row) far from the second adjacent region AR2.

According to some embodiments of the present disclosure, the sensor driver 2000 of FIG. 6 may determine the number of electrodes in each of the first inversion region RR1 and the second inversion region RR2 based on which section of the sensing region SR is located among the plurality of sections. Although the number of sections is illustrated as three by way of example, the number of sections may be less than or more than three.

The numbers of electrodes in the first inversion region RR1 and the second inversion region RR2 determined based on which section of the sensing region SR is located among the first to third sections will be described in more detail later with reference to FIGS. 10A to 10C.

Figure 10A:
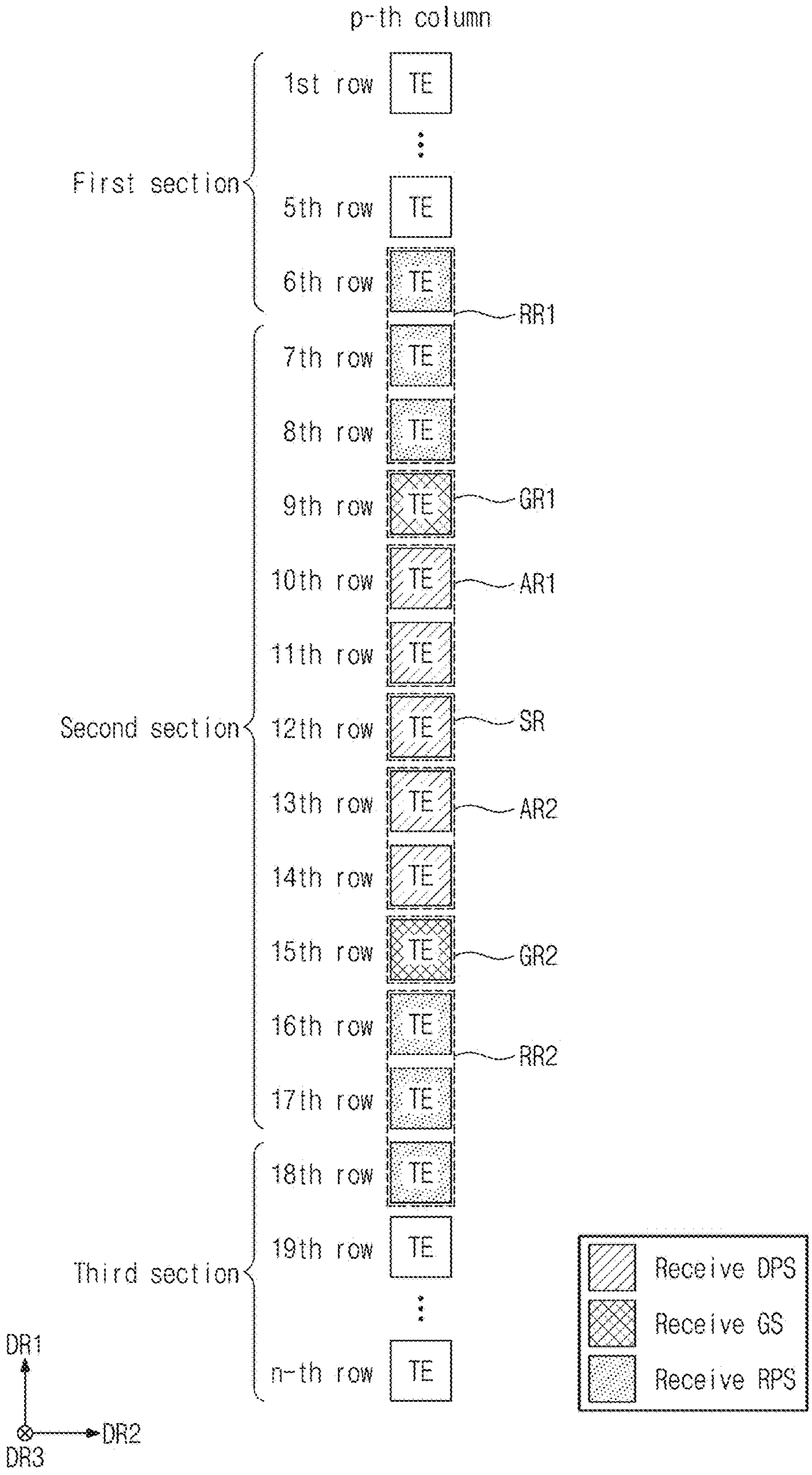
FIG. 10A is a diagram for describing the numbers of electrodes in a first inversion region and a second inversion region determined when a sensing region is located in a second section, according to some embodiments of the present disclosure.
Figure 10B:
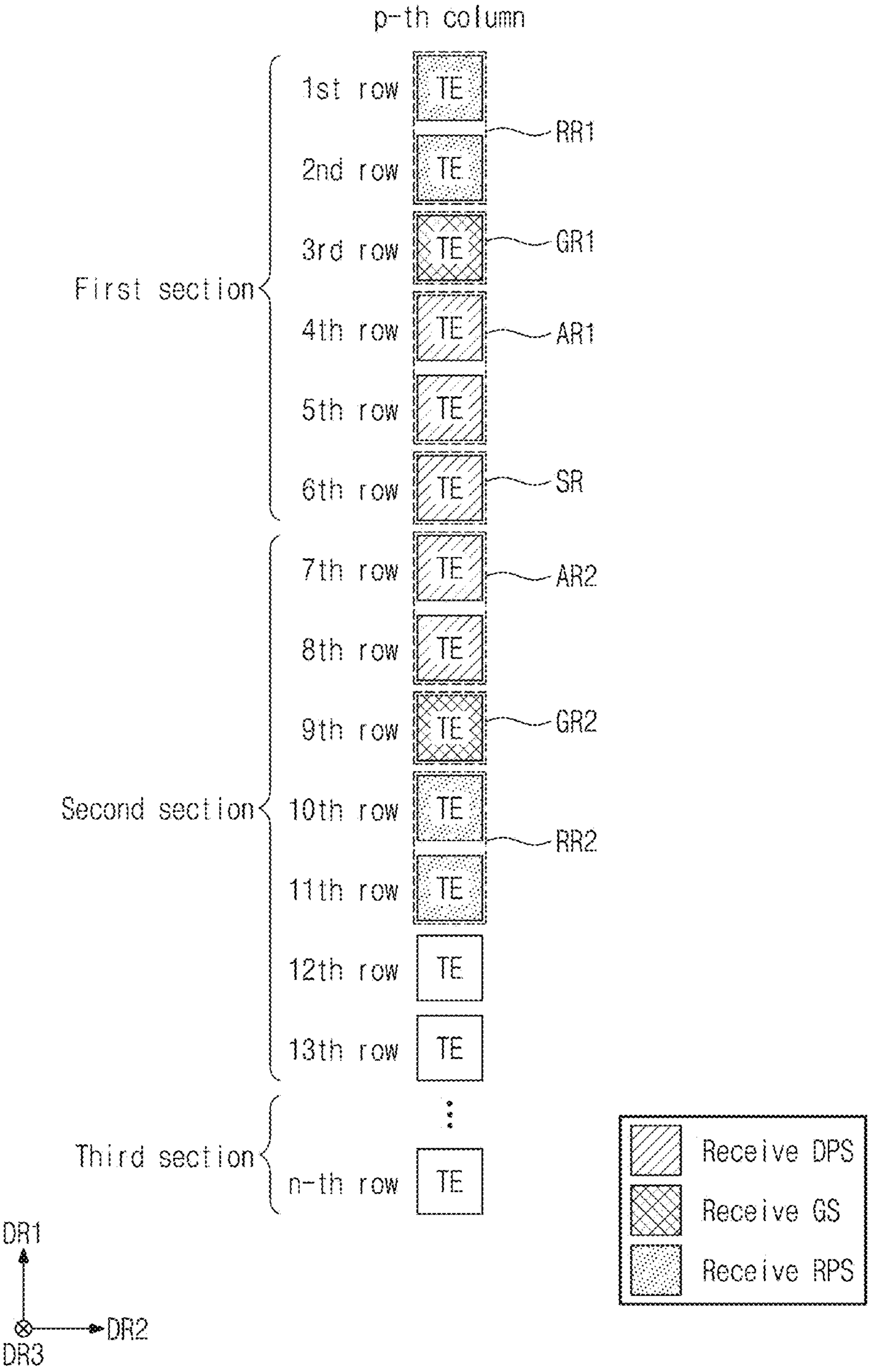
FIG. 10B is a diagram for describing the numbers of electrodes in a first inversion region and a second inversion region determined when a sensing region is located in a first section, according to some embodiments of the present disclosure.
Figure 10C:
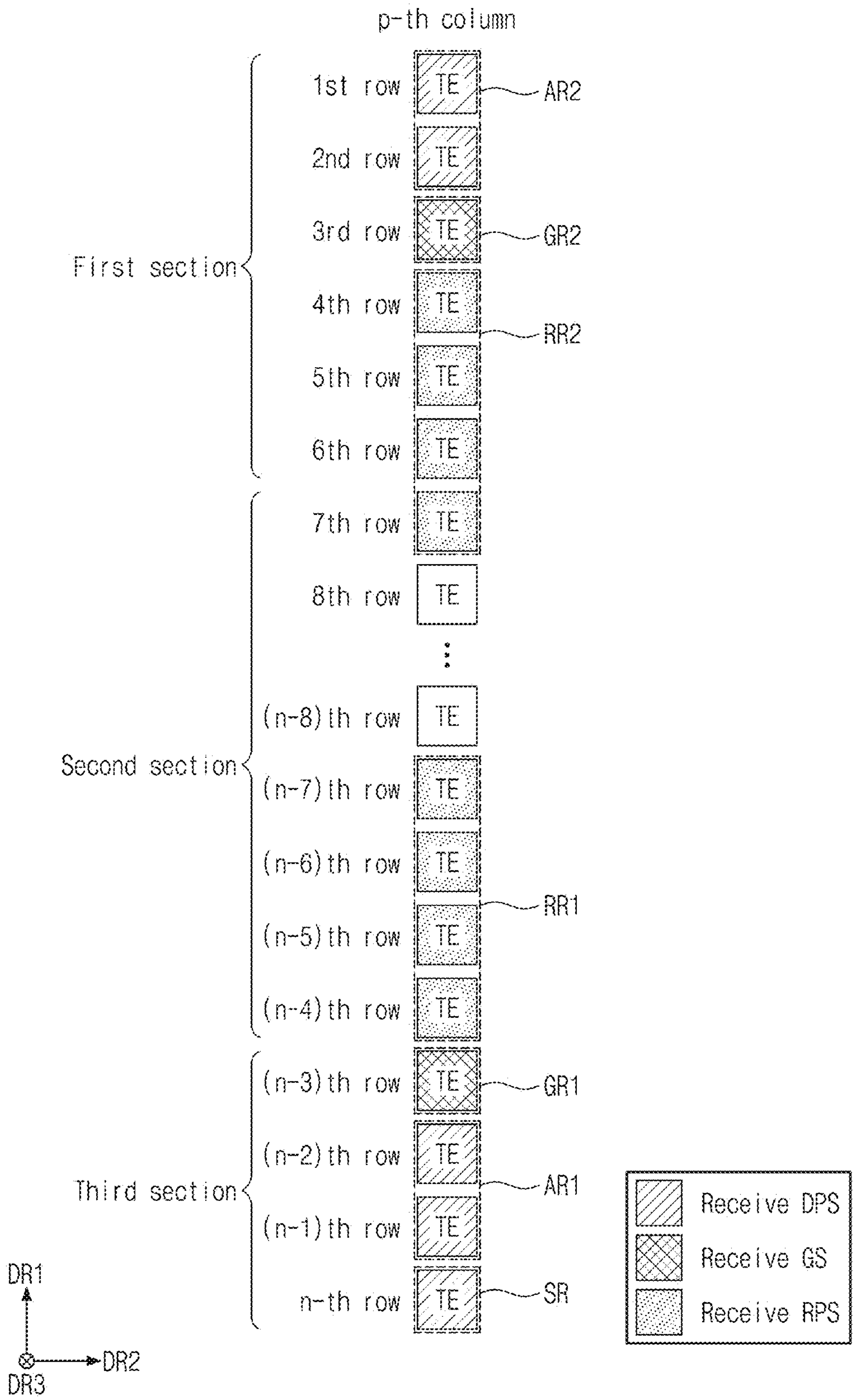
FIG. 10C is a diagram for describing the numbers of electrodes in a first inversion region and a second inversion region determined when a sensing region is located in a third section, according to some embodiments of the present disclosure.

FIGS. 10A to 10C are diagrams describing the numbers of electrodes TE in the first inversion region RR1 and the second inversion region RR2 determined based on which section of the sensing region SR is located among the first to third sections, according to some embodiments of the present disclosure.

FIG. 10A is a diagram for describing the numbers of electrodes TE in the first inversion region RR1 and the second inversion region RR2 determined when the sensing region SR is located in the second section, according to some embodiments of the present disclosure.

Referring to FIG. 10A, when the sensing region SR is located in a 12th row, which is in the second section, the numbers of electrodes TE in the first inversion region RR1 and the second inversion region RR2 may be three, respectively.

When the sensing region SR is located in the second section, the first inversion region RR1 and the first adjacent region AR1 may be located adjacent to each other, and the second inversion region RR2 and the second adjacent region AR2 may be located adjacent to each other. Therefore, to offset the generation of the EMI by the electrodes TE in the sensing region SR, the first adjacent region AR1, and the second adjacent region AR2 through the electrodes TE in the first inversion region RR1 and the electrodes TE in the second inversion region RR2, the number of electrodes TE in the first inversion region RR1 and the second inversion region RR2 may need to be three, respectively.

FIG. 10B is a diagram for describing the numbers of electrodes TE in the first inversion region RR1 and the second inversion region RR2 determined when the sensing region SR is located in the first section, according to some embodiments of the present disclosure.

Referring to FIG. 10B, when the sensing region SR is located in a sixth row, which is in the first section, the numbers of electrodes TE in the first inversion region RR1 and the second inversion region RR2 may be two, respectively.

When the sensing region SR is located in the first section and the numbers of electrodes TE in the first inversion region RR1 and the second inversion region RR2 are each three, some of the electrodes in the first inversion region RR1 may be located (e.g., in the n-th row) far from the first adjacent region AR1. Referring to FIG. 10B, since the number of electrodes in the first inversion region RR1 is two, some of the electrodes in the first inversion region RR1 may not be located (e.g., in the n-th row) far from the first adjacent region AR1.

Therefore, when the sensing region SR is located in the first section and the numbers of electrodes TE in the first inversion region RR1 and the second inversion region RR2 are each three, since the first inversion region RR1 and the first adjacent region AR1 are located far from each other, the negative driving voltage applied to the electrodes TE in the first inversion region RR1 may not effectively offset the EMI caused by the positive voltage applied to the electrodes TE in the first adjacent region AR1. In addition, the EMI may be generated due to the negative driving voltage applied to the electrodes TE in the first inversion region RR1.

For example, to prevent some of the electrodes in the first inversion region RR1 from being located far from the first adjacent region AR1 or to minimize or reduce the generation of the EMI caused by the negative driving voltage, it may be desirable to adjust the number of electrodes in the first inversion region RR1 to two.

FIG. 10C is a diagram for describing the numbers of electrodes TE in the first inversion region RR1 and the second inversion region RR2 determined when the sensing region SR is located in the third section, according to some embodiments of the present disclosure.

Referring to FIG. 10C, when the sensing region SR is located in the n-th row, which is in the third section, the numbers of electrodes TE in the first inversion region RR1 and the second inversion region RR2 may be four, respectively.

Referring to FIG. 6 and FIG. 10C, according to some embodiments of the present disclosure, the signal generation circuit 200C2 may be located in the first direction DR1 from one edge of the sensor layer 200. For example, the signal generation circuit 200C2 of FIG. 6 may be located in the first direction DR1 from the electrode TE of the n-th row of FIG. 10C. Accordingly, the intensities of the transmission signals TX (e.g., the driving pulse signals DPS, the ground signals GS, or the inversion pulse signals RPS) provided by the signal generation circuit 200C2 of FIG. 6 to the plurality of electrodes TE may be different for each row.

For example, the intensities of the transmission signals TX received to the electrodes TE of the n-th row may be stronger than the intensities of the transmission signals TX received to the electrodes TE of the first row. In other words, the absolute values of the positive or negative driving voltage that may be applied to the electrodes TE of the n-th row may be greater than those absolute values that may be applied to the electrodes TE of the first row.

As described above, when the sensing region SR is located in the third section (adjacent to the signal generation circuit 200C2 of FIG. 6), since the positive driving voltage applied to the electrodes in the sensing region SR and the first adjacent region AR1 is relatively large, there may be a need to have a relatively large number of electrodes TE to which the negative driving voltage is applied to offset the generation of the EMI. Therefore, when the sensing region SR is located in the third section, the numbers of electrodes TE in the first inversion region RR1 and the second inversion region RR2 may be four, respectively.

Figure 11A:
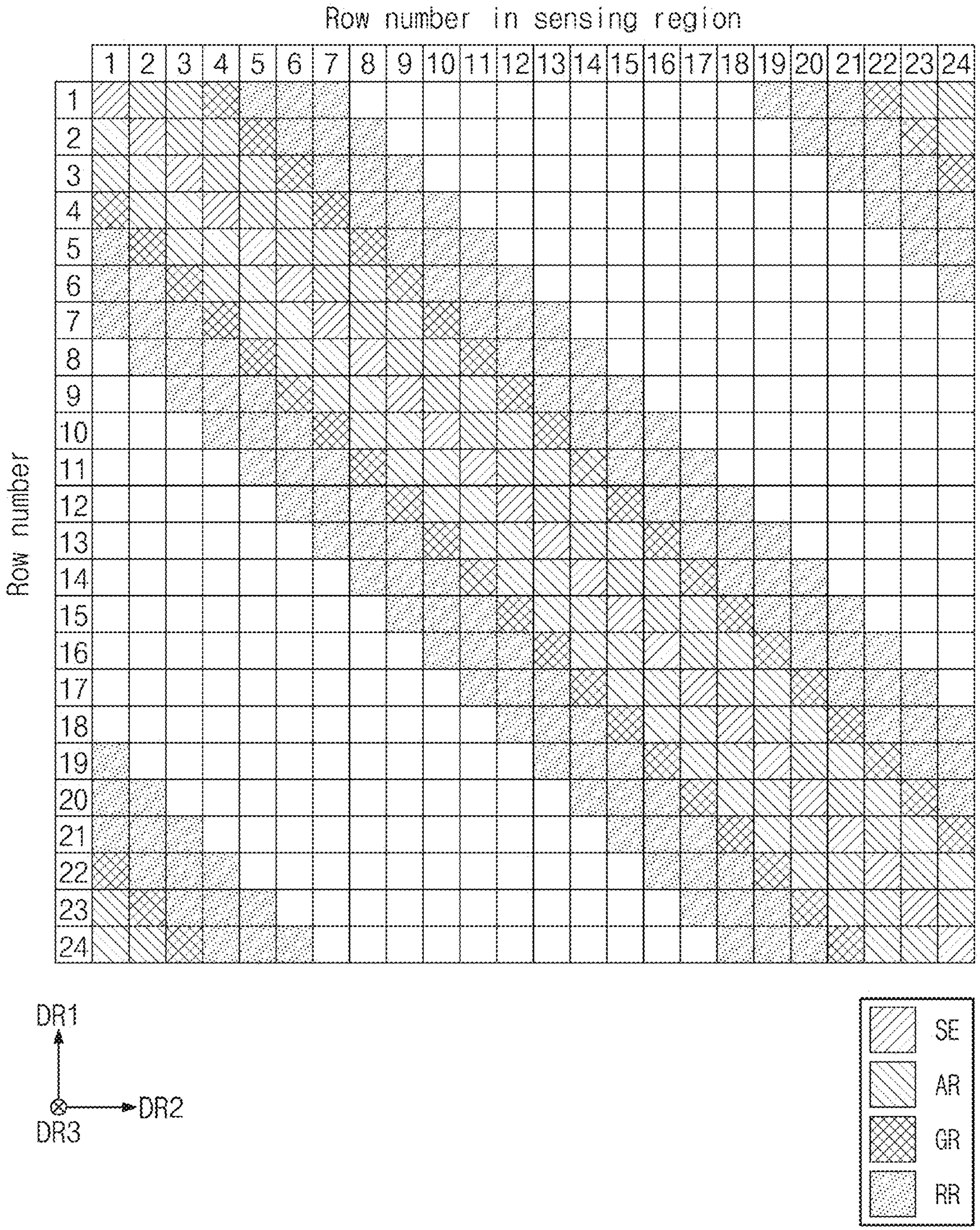
FIG. 11A is a diagram for describing a comparative example in which the numbers of electrodes in inversion regions are each fixed regardless of a location of a sensing region, unlike embodiments of the present disclosure.
Figure 11B:
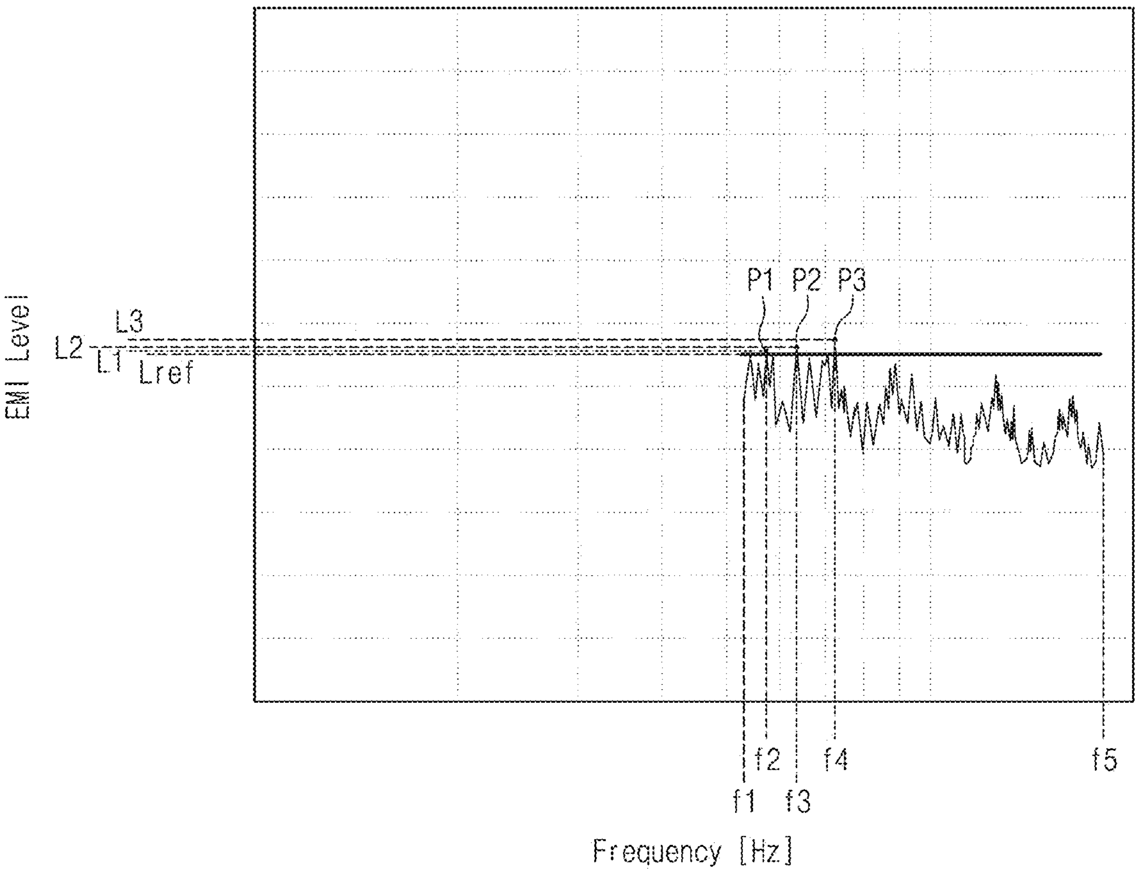
FIG. 11B is a graph for describing EMI generated when the numbers of electrodes in inversion regions are each fixed regardless of a location of a sensing region, unlike embodiments of the present disclosure.

FIGS. 11A and 11B illustrate a comparative example in which the numbers of electrodes in the first inversion region and the second inversion region are fixed, respectively, regardless of the location of the sensing region, unlike embodiments of the present disclosure.

FIG. 11A is a diagram for describing a comparative example in which the numbers of electrodes in inversion regions are each fixed regardless of a location of a sensing region, unlike embodiments of the present disclosure.

Referring to FIG. 9 and FIG. 11A, a vertical axis indicates the row number of the electrodes TE of FIG. 9, and a horizontal axis indicates the row number where the sensing region SR of FIG. 9 is located. FIG. 11A illustrates an example where the number of rows of the electrodes TE is 24, but the number of rows may be more or less than 24 depending on the size of the display panel or the size of the electrodes TE. Regardless of the row or the section where the sensing region is located, the number of electrodes in inversion regions RR may be fixed to 3, respectively.

FIG. 11B is a graph for describing the EMI generated when the numbers of electrodes in inversion regions are each fixed regardless of a location of a sensing region, unlike embodiments of the present disclosure.

Referring to FIG. 9 and FIG. 11B, a vertical axis indicates an EMI level and a horizontal axis indicates an operating frequency of the sensor layer 200 of FIG. 9. When the operating frequency of the sensor layer 200 is between a first frequency f1 and a fifth frequency f5, the EMI level may be three times higher than a reference level Lref. For example, when the frequency is a second frequency f2, the first peak value p1 may be a first level L1 higher than the reference level Lref, when the frequency is a third frequency f3, a second peak value p2 may be a second level L2 higher than the reference level Lref, and when the frequency is a fourth frequency f4, a third peak value p3 may be a third level L3 higher than the reference level Lref.

For example, when the numbers of electrodes in the first and second inversion regions RR1 and RR2 are each fixed, regardless of the location of the sensing region SR of FIG. 9 or the locations of the first and second inversion regions RR1 and RR2 of FIG. 9, the value of the EMI may be large.

Figure 12A:
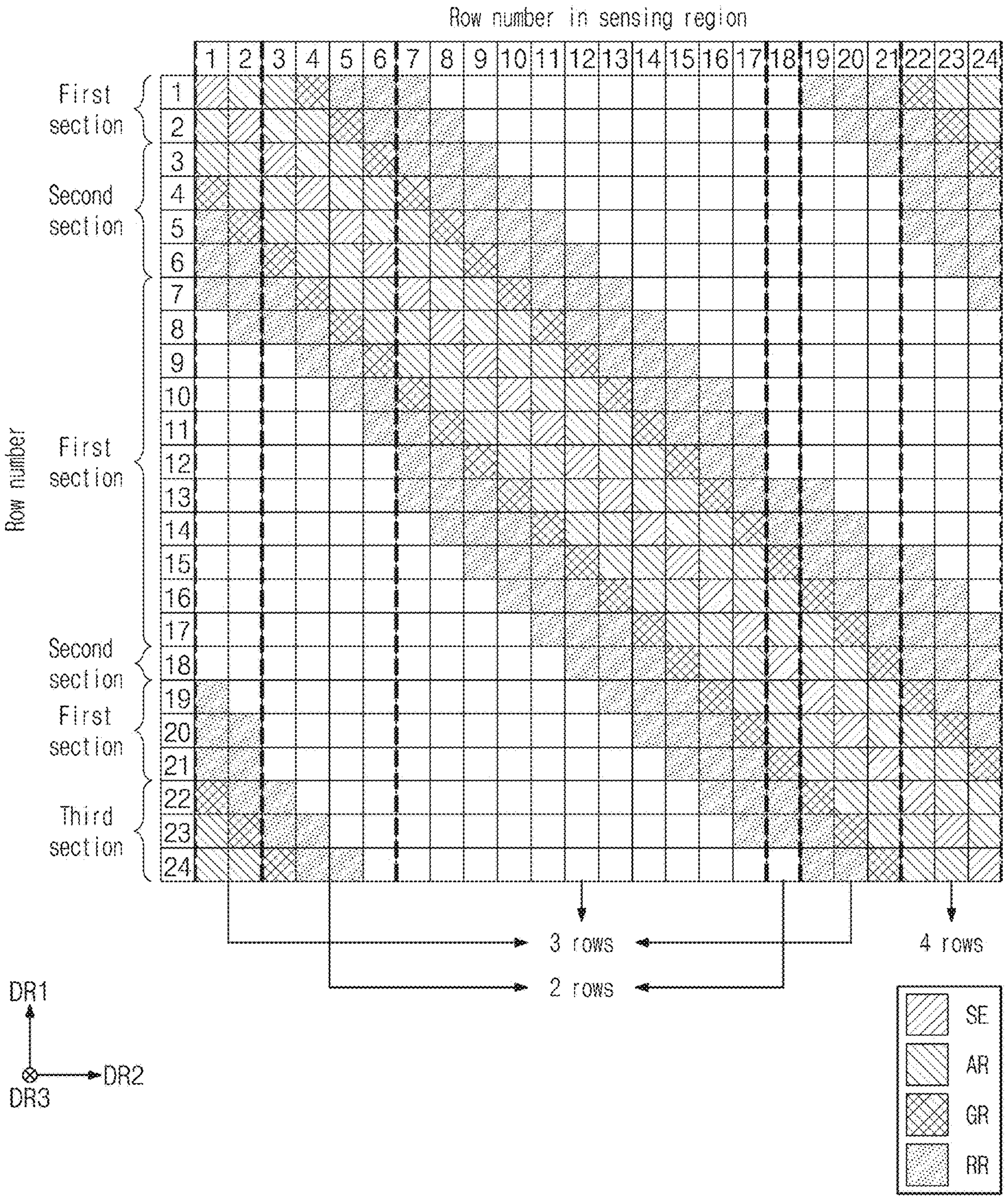
FIG. 12A is a diagram for describing aspects of embodiments in which the numbers of electrodes in inversion regions are respectively determined (variable) based on a location of a sensing region, according to some embodiments of the present disclosure.
Figure 12B:
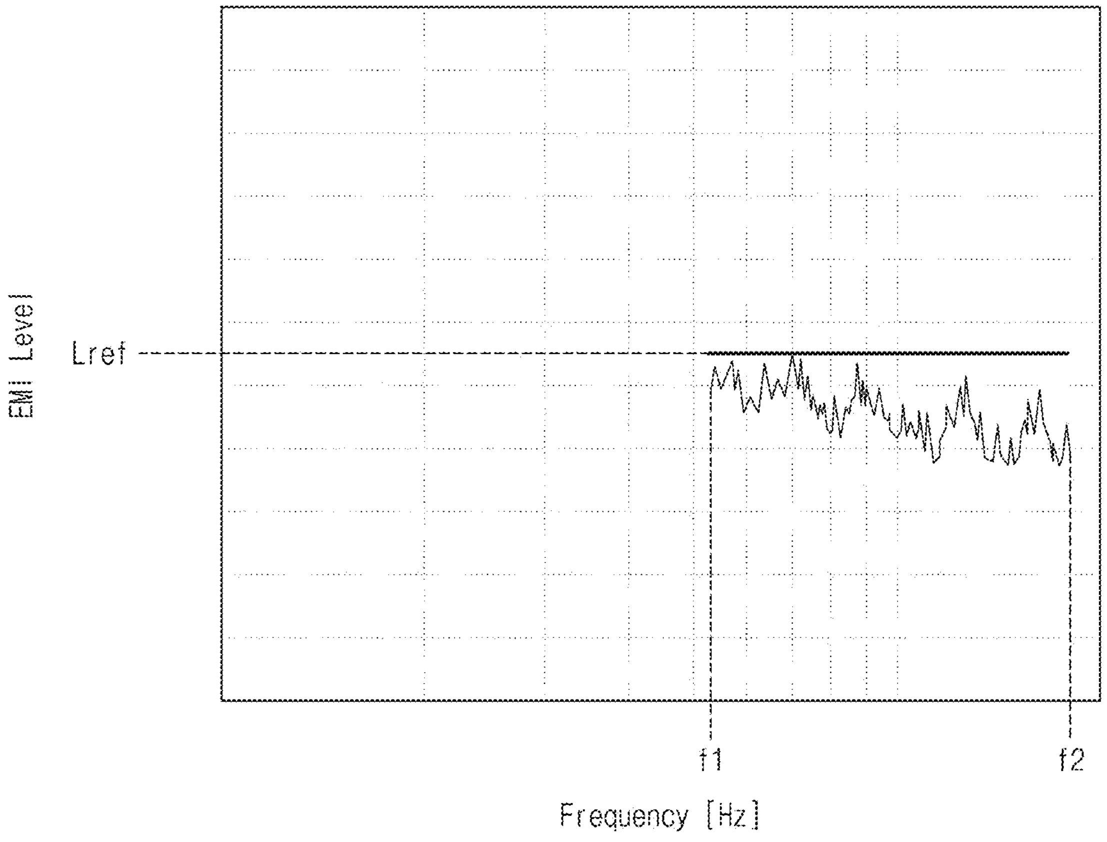
FIG. 12B is a graph for describing an EMI generated in a case in which the numbers of electrodes in inversion regions are respectively determined (variable) based on a location of a sensing region, according to some embodiments of the present disclosure.

FIG. 12A and FIG. 12B illustrate embodiments in which the numbers of electrodes in the first inversion region and the second inversion region are each determined (variable) based on the location of the sensing region, according to some embodiments of the present disclosure.

FIG. 12A is a diagram for describing aspects of embodiments in which the numbers of electrodes in inversion regions are respectively determined (variable) based on a location of a sensing region, according to some embodiments of the present disclosure.

Referring to FIG. 9 and FIG. 12A, a vertical axis indicates the row number of the electrodes TE of FIG. 9, and a horizontal axis indicates the row number where the sensing region SR of FIG. 9 is located. Based on the row or the section where the sensing region SR is located, the numbers of electrodes in the inversion regions RR may be determined (variably). FIG. 12A illustrates an example where "n" (the number of rows of the electrodes TE) is 24, but "n" may be greater than or less than 24 depending on the size of the display panel or the sizes of the electrodes TE.

According to some embodiments of the present disclosure, the first section may include a 1st row, a 2nd row, a 7th row to a 17th row, and a 19th row to a 21st row. When the sensing region SR is located in the first section, since adjacent regions AR and the inversion regions RR may be located adjacent to each other, the number of electrodes in the inversion regions RR may be each three.

In addition, the second section may include a 3rd row to a 6th row and a 18th row. When the sensing region SR is located in the second section, since the adjacent regions AR and the inversion regions RR may be located far from each other, the number of electrodes in the inversion regions RR may be each two.

Finally, the third section may include a 22nd row to a 24th row. When the sensing region SR is located in the third section, since the intensities of the driving pulse signals or the intensities of the positive driving voltages applied to the sensing region SR and the adjacent regions AR may be relatively strong as described above, the number of electrodes in the inversion regions RR may be each four.

According to some embodiments of the present disclosure, the number of electrodes arranged in the sensing region SR and the adjacent regions AR that receive the driving pulse signal DPS (refer to FIG. 6) may be fixed, and the number of electrodes in the inversion regions RR may be variable. By variably determining the number of electrodes in the inversion regions RR based on the location of the sensing region SR, the EMI having various intensities may be offset, and the EMI that may be generated by the inversion pulse signals may be minimized or reduced.

FIG. 12B is a graph for describing an EMI generated in a case in which the numbers of electrodes in inversion regions are respectively determined (variable) based on a location of a sensing region, according to some embodiments of the present disclosure.

Referring to FIG. 9 and FIG. 12B, a vertical axis indicates an EMI level and a horizontal axis indicates an operating frequency of the sensor layer 200 of FIG. 9. When the operating frequency of the sensor layer 200 is between the first frequency f1 and the second frequency f2, the EMI level may not exceed the reference level Lref. For example, when the operating frequency is between the first frequency f1 and the second frequency f2, the peak value of the EMI level may not exceed the reference level Lref.

For example, when the numbers of electrodes in the first and second inversion regions RR1 and RR2 are determined (variable) based on the location of the sensing region SR of FIG. 9 or the locations of the first and second inversion regions RR1 and RR2 of FIG. 9, the value of the EMI may be minimized or reduced.

According to some embodiments of the present disclosure, the EMI (Electro Magnetic Interference) may be generated by driving pulse signals applied to electrodes within the sensing region and adjacent regions. In this case, the EMI may be offset by inversion pulse signals applied to electrodes within the inversion regions. By variably determining the number of electrodes within the inversion regions based on the location of the sensing region, the EMI having various intensities may be offset, and the EMI that may be generated by the inversion pulse signals may be minimized or relatively reduced.

Although aspects of some embodiments of the present disclosure have been described above with reference to some embodiments thereof, it will be understood by those skilled in the art or having ordinary knowledge in the art that various modifications, and substitutions are possible, without departing from the spirit and the technical scope of embodiments according to the present disclosure as set forth in the claims below, and their equivalents. Accordingly, the technical scope of embodiments according to the present disclosure are not limited to the detailed description of this specification, but should be defined by the appended claims, and their equivalents.

What is claimed is:

1. An electronic device comprising:
- a sensor layer including a plurality of electrodes arranged in "n" rows and "m" columns; and
- a sensor driver configured to drive the sensor layer, and
- wherein the sensor driver is configured to:
- provide driving pulse signals to an electrode in a sensing region among the plurality of electrodes, electrodes in a first adjacent region preceding the sensing region in a first direction, and electrodes in a second adjacent region following the sensing region in an opposite direction to the first direction;
- provide ground signals to an electrode in a first ground region preceding the first adjacent region in the first direction and an electrode in a second ground region following the second adjacent region in the opposite direction to the first direction; and
- provide inversion pulse signals to electrodes in a first inversion region preceding the first ground region in the first direction and electrodes in a second inversion region following the second ground region in the opposite direction to the first direction, and
- wherein the electrode in the sensing region, the electrodes in the first adjacent region and the second adjacent region, the electrodes in the first ground region and the second ground region, and the electrodes in the first inversion region and the second inversion region are located in one of the "m" columns, and
- wherein the "n" and the "m" are natural numbers,
- wherein the first inversion region and the second inversion region each include electrodes arranged in consecutive rows among the "n" rows, and
- wherein the sensor driver is configured to determine numbers of electrodes in the first inversion region and the second inversion region.

2. The electronic device of claim 1, wherein the "n" rows includes a plurality of sections, and
- wherein the sensor driver is configured to determine where a row in which the sensing region is located is located among the plurality of sections.

3. The electronic device of claim 2, wherein the sensor driver is configured to determine the numbers of electrodes in the first inversion region and the second inversion region based on determining where the row in which the sensing region is located is located among the plurality of sections.

4. The electronic device of claim 3, wherein the plurality of sections include a first section and a second section, and
- wherein the sensor driver is configured to:
- determine that the numbers of electrodes in the first inversion region and the second inversion region are "p", respectively, based on determining that the sensing region is located in the first section, and
- determine that the numbers of electrodes in the first inversion region and the second inversion region are "q", respectively, based on determining that the sensing region is located in the second section, and
- wherein, the "p" and the "q" are different natural numbers.

5. The electronic device of claim 4, wherein the plurality of sections further include a third section,
- wherein the sensor driver is further configured to determine that the numbers of electrodes in the first inversion region and the second inversion region are "k", respectively, based on determining that the sensing region is located in the third section, and
- wherein, the "k" is a natural number different from the "p" and the "q".

6. The electronic device of claim 5, wherein the "p" is 3, the "q" is 2, and the "k" is 4.

7. The electronic device of claim 1, wherein the sensor driver includes a signal generation circuit located in the opposite direction to the first direction from one edge of the sensor layer, and
- the signal generation circuit is configured to provide at least one of the driving pulse signals, the ground signals, or the inversion pulse signals to at least some of the plurality of electrodes, respectively.

8. The electronic device of claim 1, wherein the driving pulse signals each include a plurality of pulses rising from a ground voltage to a positive driving voltage, and
- wherein the inversion pulse signals each include a plurality of pulses falling from the ground voltage to a negative driving voltage.

9. The electronic device of claim 1, wherein the electrode of the sensing region is configured to detect an external input based on the driving pulse signals and to generate a detection signal in response to detecting the external input.

10. The electronic device of claim 1, wherein the electrodes within the first adjacent region and the second adjacent region are each applied with a positive driving voltage based on the driving pulse signals.

11. The electronic device of claim 1, wherein the electrodes within the first ground region and the second ground region are respectively connected to ground electrodes based on the ground signals.

12. The electronic device of claim 1, wherein the electrodes within the first inversion region and the second inversion region are each applied with a negative driving voltage based on the inversion pulse signals.

13. The electronic device of claim 1, wherein the sensor driver further includes an input detection circuit configured to receive detection signals from the plurality of electrodes.

14. The electronic device of claim 1, wherein the plurality of electrodes are formed in a mesh structure.

15. The electronic device of claim 1, wherein the sensor layer is configured to receive the driving pulse signals, the ground signals, and the inversion pulse signals in a self-dot manner from the sensor driver.

16. An electronic device comprising:

a sensor layer including a plurality of electrodes arranged in "n" rows and "m" columns; and a sensor driver configured to drive the sensor layer, and wherein the plurality of electrodes include:

an electrode in a sensing region located in one of the "m" columns;

electrodes in a first adjacent region preceding the sensing region in a first direction;

electrodes in a second adjacent region following the sensing region in an opposite direction to the first direction;

electrodes in a first inversion region preceding the first adjacent region in the first direction; and electrodes in a second inversion region following the second adjacent region in the opposite direction to the first direction, and wherein the first inversion region and the second inversion region each include electrodes arranged in consecutive rows among the "n" rows, wherein the sensor driver is configured to determine numbers of electrodes in the first inversion region and the second inversion region, and wherein, the "n" and the "m" are natural numbers.

17. The electronic device of claim 16, wherein the "n" rows includes a plurality of sections, and the sensor driver is configured to determine where a row in which the sensing region is located is located among the plurality of sections, and to determine the numbers of electrodes in the first inversion region and the second inversion region based on determining where the row in which the sensing region is located is located among the plurality of sections.

18. An electronic device comprising:

a sensor layer including a plurality of electrodes arranged in "n" rows and "m" columns; and a sensor driver configured to drive the sensor layer, and wherein the plurality of electrodes include:

a plurality of electrodes configured to receive a driving pulse signal located within one of the "m" columns; and a plurality of inversion electrodes configured to receive an inversion pulse signal different from the driving pulse signal, and wherein the sensor driver is configured to determine a number of the plurality of inversion electrodes based on a location of the plurality of electrodes, and wherein, the "n" and the "m" are natural numbers, wherein the plurality of electrodes include:

an electrode in a sensing region located in one of the "m" columns;

electrodes in a first adjacent region preceding a sensing region in a first direction;

electrodes in a second adjacent region following the sensing region in an opposite direction to the first direction;

electrodes in a first inversion region preceding the first adjacent region in the first direction; and electrodes in a second inversion region following the second adjacent region in the opposite direction to the first direction wherein the first inversion region and the second inversion region each include electrodes arranged in consecutive rows among "n" rows, and wherein the sensor driver is configured to determine numbers of electrodes in the first inversion region and the second inversion region.

19. The electronic device of claim 18, wherein a number of the plurality of electrodes is fixed, and the number of the plurality of inversion electrodes is variable.

* * * * *